United States Patent
Kondo et al.

(10) Patent No.: US 10,817,013 B2
(45) Date of Patent: Oct. 27, 2020

(54) INFORMATION PROCESSING APPARATUS, METHOD OF CONTROLLING INFORMATION PROCESSING APPARATUS, NON-TRANSITORY STORAGE MEDIUM ENCODED WITH COMPUTER READABLE PROGRAM FOR INFORMATION PROCESSING APPARATUS, AND INFORMATION PROCESSING SYSTEM

(71) Applicant: NINTENDO CO., LTD., Kyoto-shi, Kyoto (JP)

(72) Inventors: Yoshihisa Kondo, Kyoto (JP); Masahiro Shoji, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 623 days.

(21) Appl. No.: 15/671,387

(22) Filed: Aug. 8, 2017

(65) Prior Publication Data
US 2018/0039299 A1 Feb. 8, 2018

(30) Foreign Application Priority Data

Aug. 8, 2016 (JP) .................................. 2016-155756

(51) Int. Cl.
*G06F 1/12* (2006.01)
*H04W 56/00* (2009.01)
(Continued)

(52) U.S. Cl.
CPC ................ *G06F 1/12* (2013.01); *G06F 1/105* (2013.01); *H04W 56/004* (2013.01);
(Continued)

(58) Field of Classification Search
CPC .. G06F 1/08; G06F 1/105; G06F 1/12; H04W 56/001; H04W 56/0015; H04W 56/004; H04W 84/20
See application file for complete search history.

(56) References Cited

U.S. PATENT DOCUMENTS 6,795,421 B1 9/2004 Heinonen et al.
8,780,885 B2 * 7/2014 Li ..................... H04W 56/0015
370/350
(Continued)

FOREIGN PATENT DOCUMENTS

JP 2001-333038 11/2001
JP 2004-152268 5/2004
(Continued)

*Primary Examiner* — Terrell S Johnson
(74) *Attorney, Agent, or Firm* — Nixon & Vanderhye PC

(57) ABSTRACT

An information processing apparatus includes a first transceiver configured to establish synchronous communication with each of a first apparatus and a second apparatus under a first wireless communication standard, and a second transceiver configured to communicate with a third apparatus under a second wireless communication standard, and a control circuit. The control circuit is configured to perform timing adjustment processing for adjusting, for providing a period of communication by the second transceiver, at least any one of timing of synchronous communication with the first apparatus and timing of synchronous communication with the second apparatus such that a time point of end of synchronous communication with the first apparatus by the first transceiver is substantially continuous to a time point of start of synchronous communication with the second apparatus by the first transceiver.

24 Claims, 32 Drawing Sheets

(51) Int. Cl.
*G06F 1/10* (2006.01)
*H04W 84/20* (2009.01)
*G06F 1/08* (2006.01)

(52) U.S. Cl.
CPC .......... H04W 56/0015 (2013.01); *G06F 1/08* (2013.01); *H04W 56/001* (2013.01); *H04W 84/20* (2013.01)

(56) References Cited

U.S. PATENT DOCUMENTS

| | | | |
|---|---|---|---|
| 10,136,291 B2* | 11/2018 | Weiss | H04B 1/385 |
| 2005/0090200 A1* | 4/2005 | Karaoguz | H04J 3/0652 |
| | | | 455/41.2 |
| 2005/0107103 A1 | 5/2005 | Melpignano | |
| 2005/0107134 A1 | 5/2005 | Morioka et al. | |
| 2006/0221926 A1 | 10/2006 | Maekawa et al. | |
| 2014/0133338 A1* | 5/2014 | Yoneyama | H04W 74/06 |
| | | | 370/252 |

FOREIGN PATENT DOCUMENTS

| | | |
|---|---|---|
| JP | 2006-295869 | 10/2006 |
| JP | 2014-72756 | 4/2014 |

* cited by examiner

FIG.6

| IDENTIFIER | THE NUMBER OF CONNECTABLE TERMINALS | THE NUMBER OF SLOTS | | SNIFF INTERVAL [ms] |
|---|---|---|---|---|
| | | THE NUMBER OF UPLINKS | THE NUMBER OF DOWNLINKS | |
| TSI0 | 2 | 3 | 3 | 10 |
| TSI1 | 4 | 1 | 1 | 5 |
| TSI2 | | 1 | 3 | 10 |
| TSI3 | | 1 | 5 | 15 |
| TSI4 | | 3 | 1 | 10 |
| TSI5 | | 3 | 3 | 15 |
| TSI6 | | 5 | 1 | 15 |
| TSI7 | 6 | 1 | 3 | 15 |
| TSI8 | | 3 | 1 | 15 |
| TSI9 | 8 | 1 | 1 | 10 |
| TSI10 | | 1 | 1 | 15 |

FIG.14

| COMBINATION PATTERN | 1 | | 2 | |
|---|---|---|---|---|
| | IDENTIFIER | THE NUMBER OF CONNECTABLE TERMINALS | IDENTIFIER | THE NUMBER OF CONNECTABLE TERMINALS |
| 1 | TSI0 | 1 | TSI9 | 1 |
| 2 | TSI2 | 2 | | 2 |
| 3 | TSI4 | 2 | | 2 |
| 4 | TSI3 | 2 | TSI10 | 2 |
| 5 | TSI5 | 2 | | 2 |
| 6 | TSI6 | 3 | | 3 |
| 7 | TSI7 | 3 | | 3 |
| 8 | TSI8 | 3 | | 3 |

INFORMATION PROCESSING APPARATUS, METHOD OF CONTROLLING INFORMATION PROCESSING APPARATUS, NON-TRANSITORY STORAGE MEDIUM ENCODED WITH COMPUTER READABLE PROGRAM FOR INFORMATION PROCESSING APPARATUS, AND INFORMATION PROCESSING SYSTEM

This nonprovisional application claims priority to Japanese Patent Application No. 2016-155756 filed with the Japan Patent Office on Aug. 8, 2016, the entire contents of which are hereby incorporated by reference.

FIELD

The present disclosure relates to an information processing apparatus which wirelessly communicates, a method of controlling an information processing apparatus, a non-transitory storage medium encoded with a computer readable program for an information processing apparatus, and an information processing system.

BACKGROUND AND SUMMARY

A wireless communication device which wirelessly communicates based on two or more different communication protocols has been available. Specifically, an electronic device including a wireless communication device which wirelessly communicates over short-range wireless communication under Bluetooth® and over a public network under IEEE 802.11 (Wi-Fi) has been available.

The electronic device includes such devices as a cellular telephone, a smartphone, a tablet computer, a personal digital assistant, a personal computer, a laptop computer, and a notebook computer.

One of problems of the wireless communication device is the possibility of deterioration in communication capability of a wireless communication device due to interference with transmission and reception by coexistent communication protocols, which results in collision between signals and deterioration or loss of a packet.

The present disclosure was made to solve the problem above, and is directed to provision of an information processing apparatus which can satisfactorily communicate data, a method of controlling an information processing apparatus, a non-transitory storage medium encoded with a computer readable program for an information processing apparatus, and an information processing system.

An information processing apparatus according to one embodiment includes a first transceiver configured to establish synchronous communication with each of a first apparatus and a second apparatus under a first wireless communication standard, a second transceiver configured to communicate with a third apparatus under a second wireless communication standard, and a control circuit. The control circuit is configured to perform timing adjustment processing for adjusting, for providing a period of communication by the second transceiver, at least any one of timing of synchronous communication with the first apparatus and timing of synchronous communication with the second apparatus such that a time point of end of synchronous communication with the first apparatus by the first transceiver is substantially continuous to a time point of start of synchronous communication with the second apparatus by the first transceiver.

In the exemplary embodiment, the first transceiver may further establish synchronous communication with a fourth apparatus under the first wireless communication standard. The control circuit may adjust, as the timing adjustment processing, timing of synchronous communication with the fourth apparatus such that a time point of end of synchronous communication with any one of the first apparatus and the second apparatus by the first transceiver is substantially continuous to a time point of start of synchronous communication with the fourth apparatus by the first transceiver when synchronous communication with the fourth apparatus is established after synchronous communication with the first apparatus or the second apparatus ended.

In the exemplary embodiment, the first transceiver may further establish synchronous communication with a fourth apparatus under the first wireless communication standard. The control circuit may adjust, as the timing adjustment processing, at least any one of timing of synchronous communication with the first apparatus, timing of synchronous communication with the second apparatus, and timing of synchronous communication with the fourth apparatus such that the time point of end of synchronous communication with the first apparatus by the first transceiver is substantially continuous to the time point of start of synchronous communication with the second apparatus by the first transceiver and such that a time point of end of synchronous communication with the second apparatus by the first transceiver is substantially continuous to a time point of start of synchronous communication with the fourth apparatus by the first transceiver.

In the exemplary embodiment, the first transceiver may further establish synchronous communication with a fifth apparatus under the first wireless communication standard. The control circuit may adjust, as the timing adjustment processing, timing of synchronous communication with the fifth apparatus when synchronous communication with the fifth apparatus is established after synchronous communication with at least one of the first apparatus, the second apparatus, and the fourth apparatus ended.

In the exemplary embodiment, the control circuit may adjust, as the timing adjustment processing, timing of synchronous communication with the fifth apparatus so as to establish synchronous communication with the fifth apparatus in at least a part of a period of synchronous communication with at least one apparatus with which synchronous communication ended.

In the exemplary embodiment, the at least one apparatus with which synchronous communication ended may be the second apparatus.

In the exemplary embodiment, the control circuit may further perform comparison processing for comparing a period of synchronous communication with at least one apparatus with which synchronous communication ended and a period of synchronous communication with the fifth apparatus with each other. The control circuit may adjust, as the timing adjustment processing, timing of synchronous communication with the fifth apparatus based on a result of comparison in the comparison processing.

In the exemplary embodiment, the control circuit may adjust, as the timing adjustment processing, timing of synchronous communication with the fifth apparatus so as to establish synchronous communication with the fifth apparatus in at least a part of the period of synchronous communication with at least one apparatus with which synchronous communication ended based on comparison between the period of synchronous communication with at least one apparatus with which synchronous communication ended and the period of synchronous communication with the fifth apparatus in the comparison processing.

In the exemplary embodiment, the control circuit may further establish synchronous communication with a fourth apparatus under the first wireless communication standard. The timing adjustment processing may adjust again at least any one of timings of continuing synchronous communications among synchronous communications with the first apparatus, the second apparatus, and the fourth apparatus such that the continuing synchronous communications are continuously established when synchronous communication with at least any one of the first apparatus, the second apparatus, and the fourth ended.

In the exemplary embodiment, intervals of synchronous communication with the first apparatus and the second apparatus by the first transceiver may be substantially identical.

In the exemplary embodiment, the control circuit may further establish synchronous communication with a fourth apparatus under the first wireless communication standard. Intervals of synchronous communication with the first apparatus, the second apparatus, and the fourth apparatus by the first transceiver may substantially be identical.

In the exemplary embodiment, the control circuit may be further configured to perform reference timing setting processing for setting reference timing serving as a reference of timing of synchronous communication with each of the first apparatus and the second apparatus by the first transceiver.

In the exemplary embodiment, the control circuit may adjust, as the timing adjustment processing, timing of synchronous communication with each of the first apparatus and the second apparatus by the first transceiver in accordance with the reference timing set in the reference timing setting processing.

In the exemplary embodiment, the control circuit may further establish synchronous communication with a fourth apparatus under the first wireless communication standard. The control circuit may adjust, as the timing adjustment processing, timing of synchronous communication with each of the first apparatus, the second apparatus, and the fourth apparatus by the first transceiver in accordance with the reference timing set in the reference timing setting processing.

In the exemplary embodiment, the control circuit may adjust, as the timing adjustment processing, at least any one of timing of synchronous communication with the second apparatus and timing of synchronous communication with the fourth apparatus such that a time point of end of synchronous communication with the second apparatus by the first transceiver is substantially continuous to a time point of start of synchronous communication with the fourth apparatus in accordance with the reference timing when synchronous communication with the fourth apparatus is established after synchronous communication with the first apparatus ended.

In the exemplary embodiment, the control circuit may further establish synchronous communication with a fifth apparatus under the first wireless communication standard. The control circuit may adjust, as the timing adjustment processing, at least any one of timing of continuing synchronous communications among synchronous communications with the first apparatus, the second apparatus, and the fourth apparatus and timing of synchronous communication with the fifth apparatus in accordance with the reference timing such that the continuing synchronous communication is continuous to synchronous communication with the fifth apparatus when synchronous communication with at least one of the first apparatus, the second apparatus, and the fourth apparatus ended.

In the exemplary embodiment, the first apparatus and the second apparatus may be identical in type.

In the exemplary embodiment, the first apparatus, the second apparatus, and the fourth apparatus may be identical in type.

An information processing apparatus according to another embodiment includes a memory which stores a plurality of pieces of communication setting information in accordance with a prescribed wireless communication standard, a control circuit which sets at least one piece of the communication setting information among the plurality of pieces of communication setting information stored in the memory, and a transceiver which establishes synchronous communication with another apparatus in accordance with the communication setting information set by the control circuit. Each of the at least one piece of communication setting information includes information in which the number of slots and a periodic interval of synchronous communication with another apparatus are associated with each other.

In the exemplary embodiment, the communication setting information may further include information on the number of other apparatuses which can establish synchronous communication with the transceiver.

In the exemplary embodiment, the control circuit may manage the number of other apparatuses connected to the transceiver, and when the control circuit determines that the number of other apparatuses which establish synchronous communication with the transceiver exceeds an upper limit value of the number of other apparatuses included in communication information setting information, the control circuit may set communication setting information different in number of other apparatuses with which synchronous communication can be established among the plurality of pieces of communication setting information stored in the memory.

In the exemplary embodiment, the control circuit may be further configured to preferentially set communication setting information including the number of slots the same as the number of slots included in communication setting information before change, among the plurality of pieces of communication setting information.

In the exemplary embodiment, the control circuit may manage an amount of data communicated to the transceiver in synchronization, and may set communication setting information different in number of slots among the plurality of pieces of communication setting information stored in the memory in accordance with increase and decrease in amount of data communicated to the transceiver in synchronization.

In the exemplary embodiment, the control circuit may be further configured to set one piece of communication setting information among the plurality of pieces of communication setting information stored in the memory based on execution of a prescribed application.

In the exemplary embodiment, the transceiver may transmit identification information indicating the set communication setting information to another apparatus.

An information processing apparatus according to yet another embodiment includes a control circuit which sets any mode of a normal mode in which synchronous communication with each of a plurality of other apparatuses is established and a communication prioritized mode in which communication with one of the plurality of other apparatuses is prioritized and a transceiver which establishes synchronous communication with the plurality of other apparatuses in accordance with the mode set by the control circuit.

In the exemplary embodiment, the control circuit may be further configured to change at least any one of the number of slots and a periodic interval of synchronous communication with other apparatuses.

In the exemplary embodiment, the control circuit may be further configured to set the communication prioritized mode based on an amount of communicated data.

In the exemplary embodiment, the transceiver may be further configured to communicate within a prescribed period in which connection with remaining apparatuses other than one of the plurality of other apparatuses can be maintained when the communication prioritized mode is set.

In the exemplary embodiment, the transceiver may communicate with each of the remaining other apparatuses within the prescribed period when the communication prioritized mode is set.

In the exemplary embodiment, the transceiver may be further configured to give information indicative of the communication prioritized mode to the remaining other apparatuses when the communication prioritized mode is set.

In the exemplary embodiment, the transceiver may give information indicating that communication with the remaining other apparatuses will start in a prescribed period when the communication prioritized mode is set.

In the exemplary embodiment, other apparatuses may be controllers each having an operation apparatus.

A method of controlling an information processing apparatus according to one embodiment includes establishing synchronous communication with each of a first apparatus and a second apparatus under a first wireless communication standard, communicating with a third apparatus under a second wireless communication standard, and adjusting, for providing a period of communication with the third apparatus, at least any one of timing of synchronous communication with the first apparatus and timing of synchronous communication with the second apparatus such that a time point of end of synchronous communication with the first apparatus is substantially continuous to a time point of start of synchronous communication with the second apparatus.

A non-transitory storage medium encoded with a computer readable program for an information processing apparatus according to one embodiment executed by a computer of the information processing apparatus which can communicate with a first apparatus, a second apparatus, and a third apparatus is provided. The program causes the computer of the information processing apparatus to perform first communication processing for establishing synchronous communication with each of the first apparatus and the second apparatus under a first wireless communication standard, second communication processing for communicating with the third apparatus under a second wireless communication standard, and timing adjustment processing for adjusting, for providing a period of communication in the second communication processing, at least any one of timing of synchronous communication with the first apparatus and timing of synchronous communication with the second apparatus such that a time point of end of synchronous communication with the first apparatus in the first communication processing is substantially continuous to a time point of start of synchronous communication with the second apparatus in the first communication processing.

An information processing system according to one embodiment includes an information processing apparatus and a first apparatus, a second apparatus, and a third apparatus which can communicate with the information processing apparatus. The information processing apparatus includes a transceiver and a control circuit which controls the transceiver. The control circuit performs first communication processing for establishing synchronous communication with each of the first apparatus and the second apparatus under a first wireless communication standard, second communication processing for communicating with the third apparatus under a second wireless communication standard, and timing adjustment processing for adjusting, for providing a period of communication in the second communication processing, at least any one of timing of synchronous communication with the first apparatus and timing of synchronous communication with the second apparatus such that a time point of end of synchronous communication with the first apparatus in the first communication processing is substantially continuous to a time point of start of synchronous communication with the second apparatus in the first communication processing.

A method of controlling an information processing apparatus according to another embodiment includes setting one piece of communication setting information among a plurality of pieces of communication setting information in accordance with a prescribed wireless communication standard and establishing synchronous communication with another apparatus in accordance with the set communication setting information. Each piece of communication setting information includes information in which the number of slots and a periodic interval of synchronous communication with another apparatus are associated with each other.

A non-transitory storage medium encoded with a computer readable program for an information processing apparatus according to another embodiment causes a computer of the information processing apparatus to perform setting processing for setting one piece of communication setting information among a plurality of pieces of communication setting information in accordance with a prescribed wireless communication standard stored in a memory and communication processing for establishing synchronous communication with another apparatus in accordance with the communication setting information set in the setting processing. Each piece of communication setting information includes information in which the number of slots and a periodic interval of synchronous communication with another apparatus are associated with each other.

An information processing system according to another embodiment includes an information processing apparatus and another apparatus which can communicate with the information processing apparatus. The information processing apparatus includes a memory which stores a plurality of pieces of communication setting information in accordance with a prescribed wireless communication standard, a control circuit which sets at least one piece of communication setting information among the plurality of pieces of communication setting information stored in the memory, and a transceiver which establishes synchronous communication with another apparatus in accordance with the communication setting information set by the control circuit. Each piece of communication setting information includes information in which the number of slots and a periodic interval of synchronous communication with another apparatus are associated with each other.

A method of controlling an information processing apparatus according to yet another embodiment includes setting any mode of a normal mode in which synchronous communication with each of a plurality of other apparatuses is established and a communication prioritized mode in which communication with one of the plurality of other apparatuses is prioritized and establishing synchronous communication with the plurality of other apparatuses in accordance with the set mode.

A non-transitory storage medium encoded with a computer readable program for an information processing apparatus according to yet another embodiment executed by a computer of the information processing apparatus provided to be able to establish synchronous communication with other apparatuses is provided. The program causes the computer of the information processing apparatus to perform mode setting processing for setting any mode of a normal mode in which synchronous communication with each of a plurality of other apparatuses is established and a communication prioritized mode in which communication with one of the plurality of other apparatuses is prioritized and communication processing for establishing synchronous communication with the plurality of other apparatuses in accordance with the mode set in the mode setting processing.

An information processing system according to yet another embodiment includes an information processing apparatus and other apparatuses which can communicate with the information processing apparatus. The information processing apparatus includes a transceiver and a control circuit which controls the transceiver. The control circuit performs mode setting processing for setting any mode of a normal mode in which synchronous communication with each of a plurality of other apparatuses is established and a communication prioritized mode in which communication with one of the plurality of other apparatuses is prioritized and communication processing for establishing synchronous communication with the plurality of other apparatuses through the transceiver in accordance with the mode set in the mode setting processing.

An information processing apparatus according to yet another embodiment includes a transceiver and a control circuit which controls the transceiver. The control circuit performs first communication processing for establishing synchronous communication with other apparatuses under a first wireless communication standard, second communication processing for establishing synchronous communication with other apparatuses under a second wireless communication standard, and timing adjustment processing for adjusting, for providing a period of communication in the second communication processing, at least any one of timing of synchronous communication with a first apparatus among other apparatuses and timing of synchronous communication with a second apparatus among other apparatuses such that a time point of end of synchronous communication with the first apparatus in the first communication processing is substantially continuous to a time point of start of synchronous communication with the second apparatus in the first communication processing.

The foregoing and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 6 is a diagram illustrating a table relating to communication setting information in a sniff mode based on the first embodiment.

FIG. 14 is a diagram illustrating a pattern of combination of identifier TSIs different in type based on a second embodiment.

DETAILED DESCRIPTION OF NON-LIMITING EXAMPLE EMBODIMENTS

Figure 1:
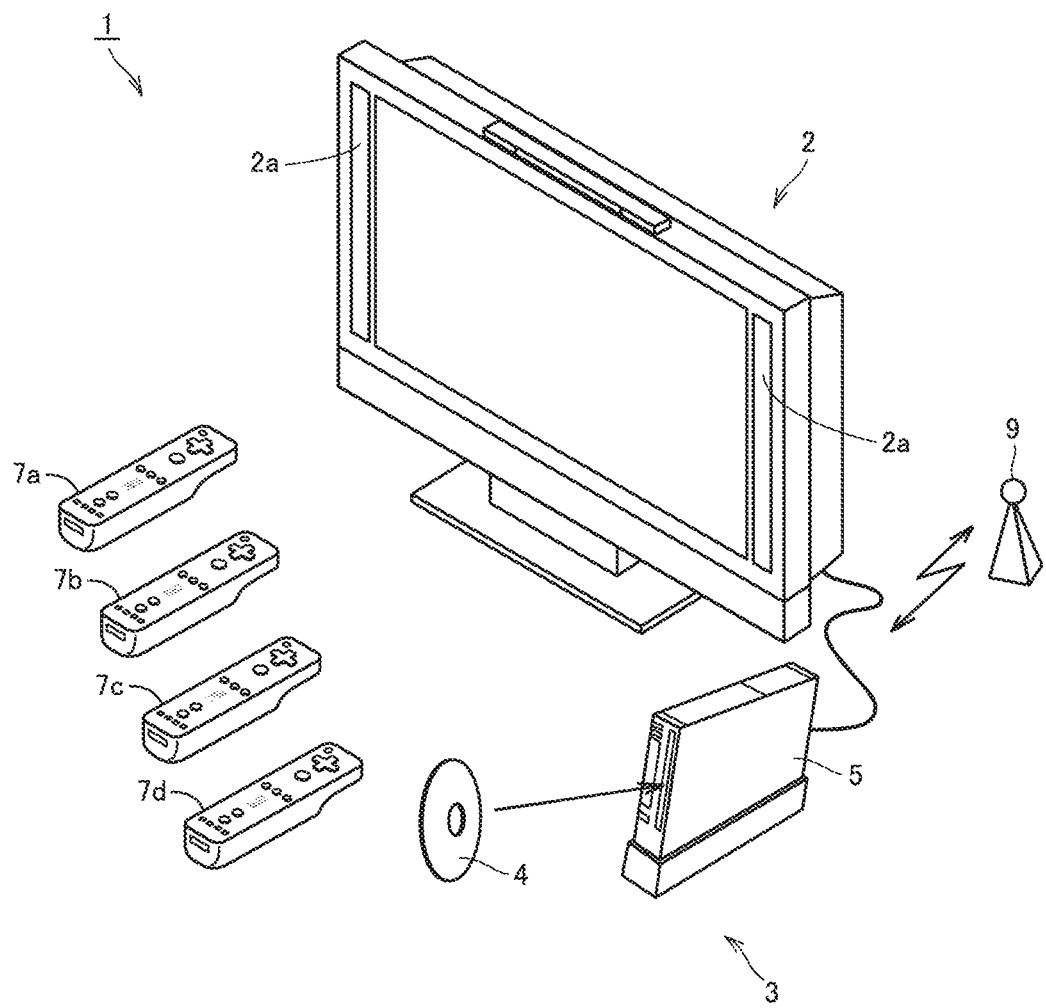
FIG. 1 is a diagram illustrating an overall system 1 based on a first embodiment.

This embodiment will be described in detail with reference to the drawings. The same or corresponding elements in the drawings have the same reference characters allotted and description thereof will not be repeated.

First Embodiment

[A. Configuration of Overall System]
[a1. Configuration of Overall System]

FIG. 1 is a diagram illustrating an overall system 1 based on a first embodiment.

In FIG. 1, overall system 1 includes a monitor 2, a stationary information processing system 3 connected to monitor 2 through a connection cord, and an access point 9.

Monitor 2 is a home television receiver representing one example of display means. Monitor 2 includes a speaker 2a.

Information processing system 3 includes an optical disc 4, an information processing apparatus main body 5 (which is hereinafter also referred to a main body 5), and controllers 7a to 7d (which are hereinafter simply denoted as a controller 7 when it is not particularly necessary to explain controllers 7a to 7d as being distinguished from one another).

Optical disc 4 stores an information processing program (typically, a game program) to be executed in information processing apparatus main body 5.

Monitor 2 shows a game image output from information processing apparatus main body 5. Monitor 2 has speaker 2a and speaker 2a outputs game sound output from information processing apparatus main body 5.

Information processing apparatus main body 5 performs game processing based on a game program stored in optical disc 4.

Controller 7 is provided with a plurality of operation portions (operation buttons). Controller 7 transmits operation data indicating a state of input onto the operation portion (whether or not each operation button has been pressed) to information processing apparatus main body 5, for example, with a Bluetooth® (a first wireless communication standard) technique.

Access point 9 is provided to allow communication (Wi-Fi communication) over wireless LAN with information processing apparatus main body 5 under a scheme in conformity, for example, with IEEE 802.11 standards (a second wireless communication standard). In particular, interference with such standards as IEEE 802.11b, IEEE 802.11g, and IEEE 802.11n (second wireless communication standard) using substantially the same frequency band as a frequency band from 2.4 to 2.5 GHz for communication under Bluetooth® (first wireless communication standard) may take place.

[a2. Hardware Configuration of Information Processing Apparatus Main Body]

Figure 2:
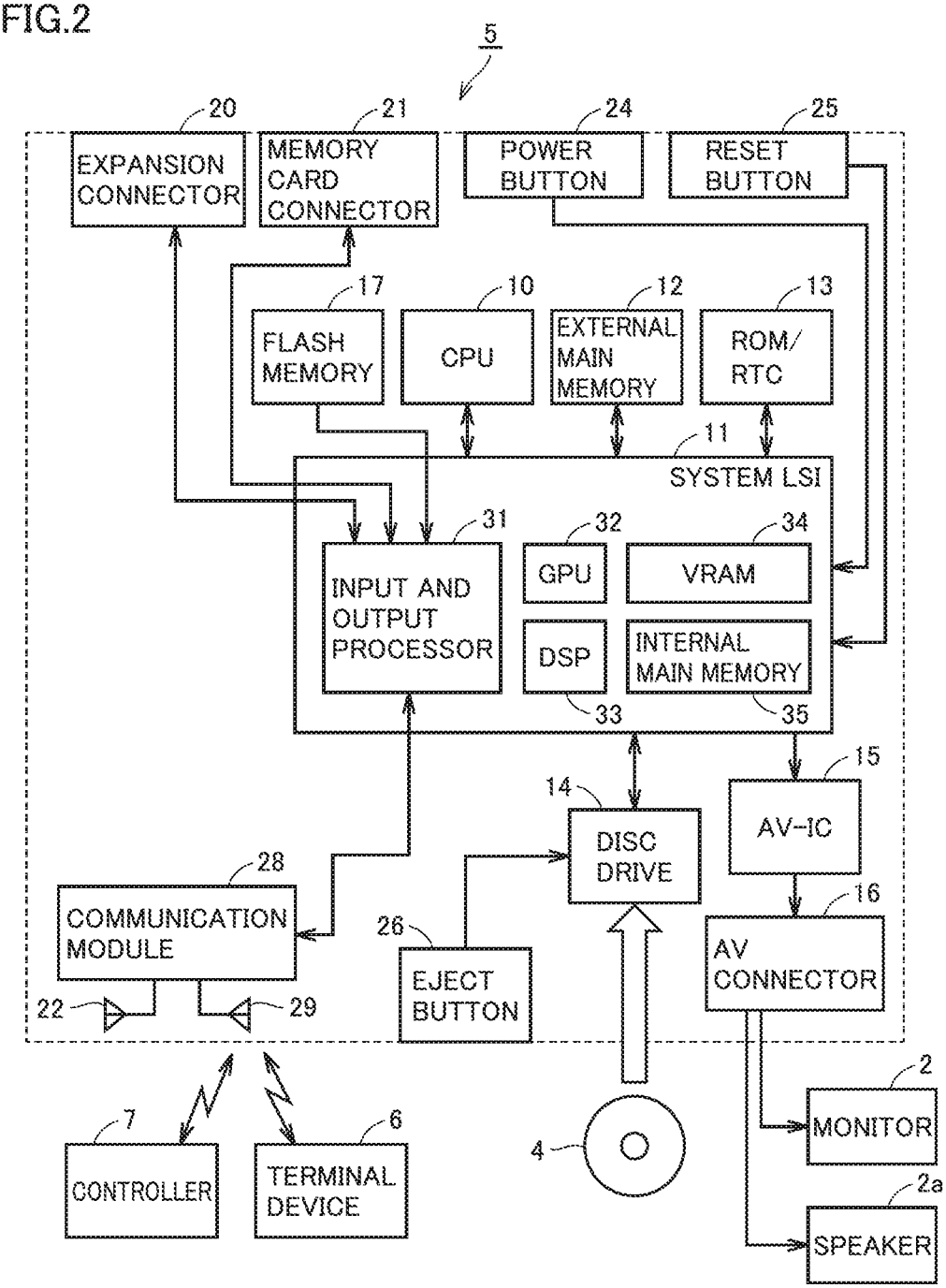
FIG. 2 is a diagram illustrating a hardware configuration of an information processing apparatus main body 5 based on the first embodiment.

FIG. 2 is a diagram illustrating a hardware configuration of information processing apparatus main body 5 based on the first embodiment.

FIG. 2 shows an internal configuration of information processing apparatus main body 5.

Specifically, information processing apparatus main body 5 includes a central processing unit (CPU) 10, a system large scale integration (LSI) 11, an external main memory 12, a read only memory/real time clock (ROM/RTC) 13, a disc drive 14, and an audio video-integrated circuit (AV-IC) 15.

External main memory 12, ROM/RTC 13, disc drive 14, and AV-IC 15 in addition to CPU 10 are connected to system LSI 11. Volatile external main memory 12 is used as a working area or a buffer area of CPU 10. ROM/RTC 13 has a ROM (what is called a boot ROM) in which a program for launching information processing apparatus main body 5 is incorporated and a clock circuit (RTC) which counts time. Disc drive 14 reads program data or texture data from optical disc 4 and writes the read data into an internal main memory 35 which will be described later or external main memory 12.

System LSI 11 is provided with an input and output processor (I/O processor) 31, a graphics processor unit (GPU) 32, a digital signal processor (DSP) 33, a video RAM (VRAM) 34, and internal main memory 35.

GPU 32 generates an image in accordance with a graphics command (a rendering instruction) from CPU 10. In an embodiment, information processing apparatus main body 5 may generate a game image to be shown on monitor 2.

DSP 33 functions as an audio processor and generates audio data by using sound data or sound waveform (tone) data stored in internal main memory 35 or external main memory 12.

As set forth above, image data and audio data to be output to monitor 2 of images and sounds generated in information processing apparatus main body 5 are read by AV-IC 15. AV-IC 15 outputs read image data to monitor 2 through an AV connector 16 and outputs read audio data to speaker 2a contained in monitor 2. Thus, monitor 2 shows images and speaker 2a outputs sound.

Input and output processor 31 transmits and receives data to and from a component connected thereto and downloads data from an external apparatus. Input and output processor 31 is connected to a flash memory 17, an expansion connector 20, a memory card connector 21, and a communication module 28.

Information processing apparatus main body 5 can be connected to a network such as the Internet through access point 9 and can communicate with an external information processing apparatus (for example, other information processing apparatuses or various servers). Input and output processor 31 can be connected to a network via access point 9 through communication module 28 and an antenna 22 and can communicate with an external information processing apparatus connected to the network. Flash memory 17 may store not only data transmitted and received between information processing apparatus main body 5 and an external information processing apparatus but also save data (data on a result of processing or in-progress data of processing) of a game played with information processing apparatus main body 5. Flash memory 17 may store a program such as a game program.

Information processing apparatus main body 5 can transmit and receive data to and from controller 7. In the present example, information processing apparatus main body 5 can receive operation data from controller 7. Input and output processor 31 receives operation data transmitted from controller 7 through an antenna 29 and communication module 28 and has the operation data (temporarily) stored in a buffer area of internal main memory 35 or external main memory 12.

Information processing apparatus main body 5 can be connected to other devices or external storage media through expansion connector 20 or memory card connector 21.

Information processing apparatus main body 5 (for example, a front main surface) is provided with a power button 24, a reset button 25, a port for attachment and removal of optical disc 4, and an eject button 26 for taking optical disc 4 out of the port in information processing apparatus main body 5.

In other embodiments, some of components in information processing apparatus main body 5 may be configured as expansion devices separate from information processing apparatus main body 5. The expansion device may be connected to information processing apparatus main body 5, for example, with expansion connector 20 being interposed.

[a3. Hardware Configuration of Controller 7]

Figure 3:
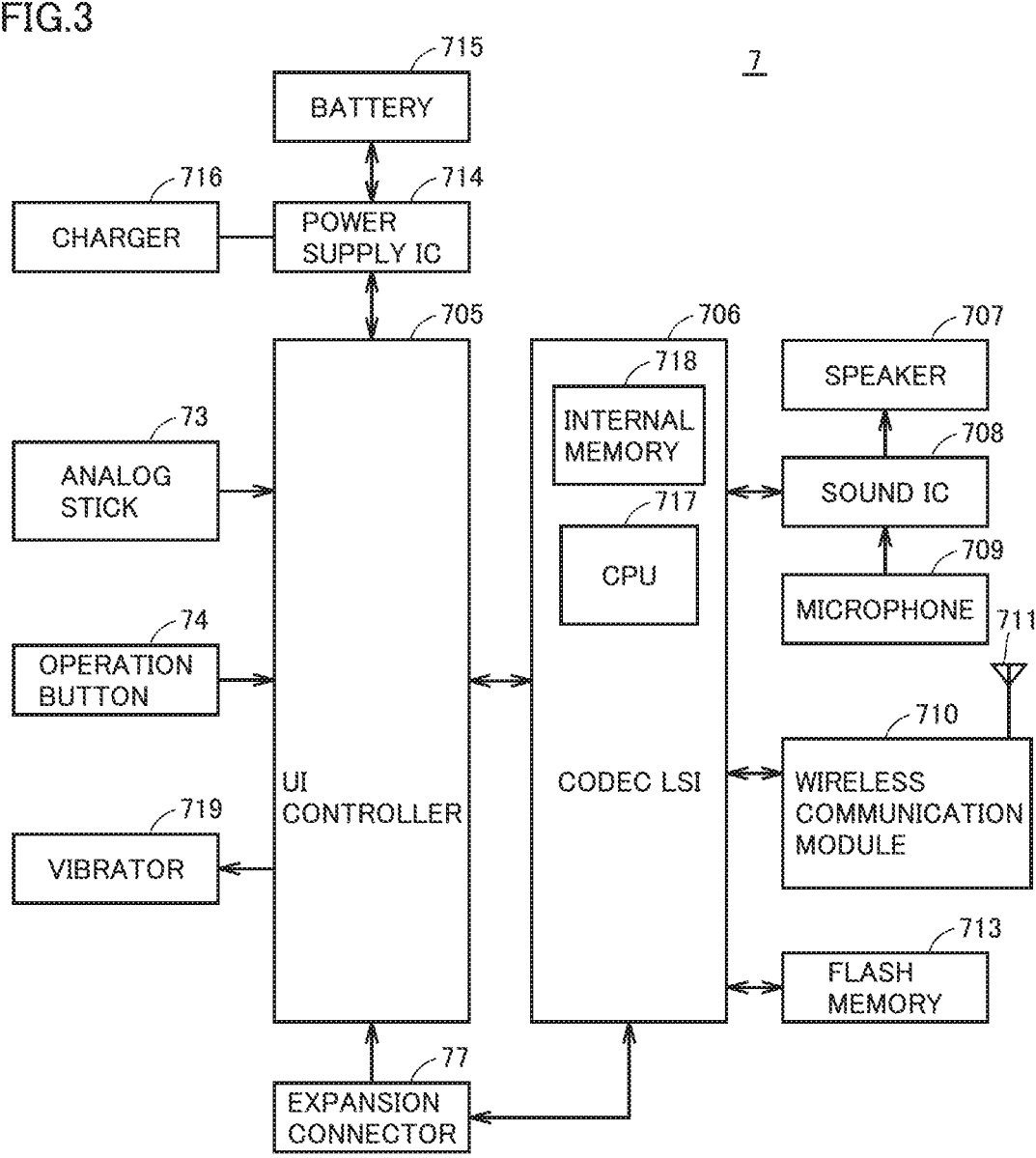
FIG. 3 is a diagram illustrating a hardware configuration of a controller 7 based on the first embodiment.

FIG. 3 is a diagram illustrating a hardware configuration of controller 7 based on the first embodiment.

As shown in FIG. 3, controller 7 includes a user interface controller (UI controller) 705, a codec LSI 706, a speaker 707, a sound IC 708, a microphone 709, a wireless communication module 710, an antenna 711, a flash memory 713, a power supply IC 714, a battery 715, and a vibrator 719. These electronic components are accommodated in a housing as being mounted on an electronic circuit board.

UI controller 705 is a circuit for controlling input and output of data to and from various input and output portions.

UI controller 705 is connected to an analog stick 73, an operation button 74 (each operation button), and vibrator 719. UI controller 705 is connected to codec LSI 706 and an expansion connector 77. Power supply IC 714 is connected to UI controller 705 so that power is supplied to each unit by means of UI controller 705. Embedded battery 715 is connected to power supply IC 714 so that power is supplied. A charger 716 or a cable with which power can be obtained from an external power supply through a connector can be connected to power supply IC 714 so that controller 7 can be supplied with power and charged by an external power supply through charger 716 or a cable.

Analog stick 73 outputs stick data representing a direction and an amount of slide (tilt) of a stick portion to UI controller 705. Operation button 74 outputs operation button data representing a state of input onto each operation button 74 (whether or not the operation button is pressed) to UI controller 705.

Vibrator 719 is implemented, for example, by a vibration motor or a solenoid, and vibration is generated in controller 7 as vibrator 719 is activated in response to a control instruction output from UI controller 705 to vibrator 719.

UI controller 705 outputs operation data including stick data, operation button data, azimuth data, acceleration data, and angular speed data received from the components above to codec LSI 706.

Codec LSI 706 is a circuit which performs processing for compressing data to be transmitted to information processing apparatus main body 5 and processing for expanding data transmitted from information processing apparatus main body 5. Sound IC 708, wireless communication module 710, and flash memory 713 are connected to codec LSI 706. Codec LSI 706 includes a CPU 717 and an internal memory 718. For example, though controller 7 does not perform game processing itself, it should execute a minimum program for management of or communication by controller 7. By way of example, controller 7 is launched by reading of a program stored in flash memory 713 to internal memory 718 at the time of turn-on of power and execution of the program by CPU 717. A partial area of internal memory 718 is used as a working area of CPU 717.

Sound IC 708 is a circuit which controls input and output of audio data to and from speaker 707 and microphone 709.

Codec LSI 706 transmits audio data from microphone 709 and operation data from UI controller 705 to information processing apparatus main body 5 through wireless communication module 710. In an embodiment, codec LSI 706 performs processing for compressing audio data. Compressed audio data and operation data are output to wireless communication module 710 as transmission data. Antenna 711 is connected to wireless communication module 710 and wireless communication module 710 transmits transmission data to information processing apparatus main body 5 through antenna 711. Wireless communication module 710 is the same in function as communication module 28 in information processing apparatus main body 5. Wireless communication module 710 transmits and receives data to and from information processing apparatus main body 5, for example, under Bluetooth® standards.

As set forth above, transmission data transmitted from controller 7 to information processing apparatus main body 5 includes operation data and audio data. When another apparatus is connected to controller 7 with expansion connector 77 being interposed, data received from another apparatus may further be included in transmission data.

As described above, compressed audio data is transmitted from information processing apparatus main body 5 to controller 7. Such data is received by codec LSI 706 through antenna 711 and wireless communication module 710. Codec LSI 706 expands the received audio data. The expanded audio data is output to sound IC 708 and sound in accordance with the audio data is output from speaker 707.

When data received from information processing apparatus main body 5 includes control data, codec LSI 706 and UI controller 705 give a control instruction in accordance with the control data to each unit. As described above, control data represents a control instruction to each component in controller 7 (in an embodiment, vibrator 719). In an embodiment, a control instruction represented by control data includes an instruction to operate each component or to suspend (stop) an operation. A component not used in a game may be inactivated in order to suppress power consumption, and in that case, transmission data transmitted from controller 7 to information processing apparatus main body 5 is prevented from including data from an inactivated component.

Controller 7 can also be provided with an acceleration sensor and a gyro sensor. Acceleration data representing an acceleration detected by the acceleration sensor and angular speed data representing an angular speed detected by the gyro sensor may be transmitted to information processing apparatus main body 5. Information processing apparatus main body 5 can also calculate an orientation or a motion of controller 7 based on the acceleration data and/or the angular speed data.

[B. Overview of Communication Processing]

[b1. Functional Block Configuration of Information Processing Apparatus Main Body 5]

Figure 4:
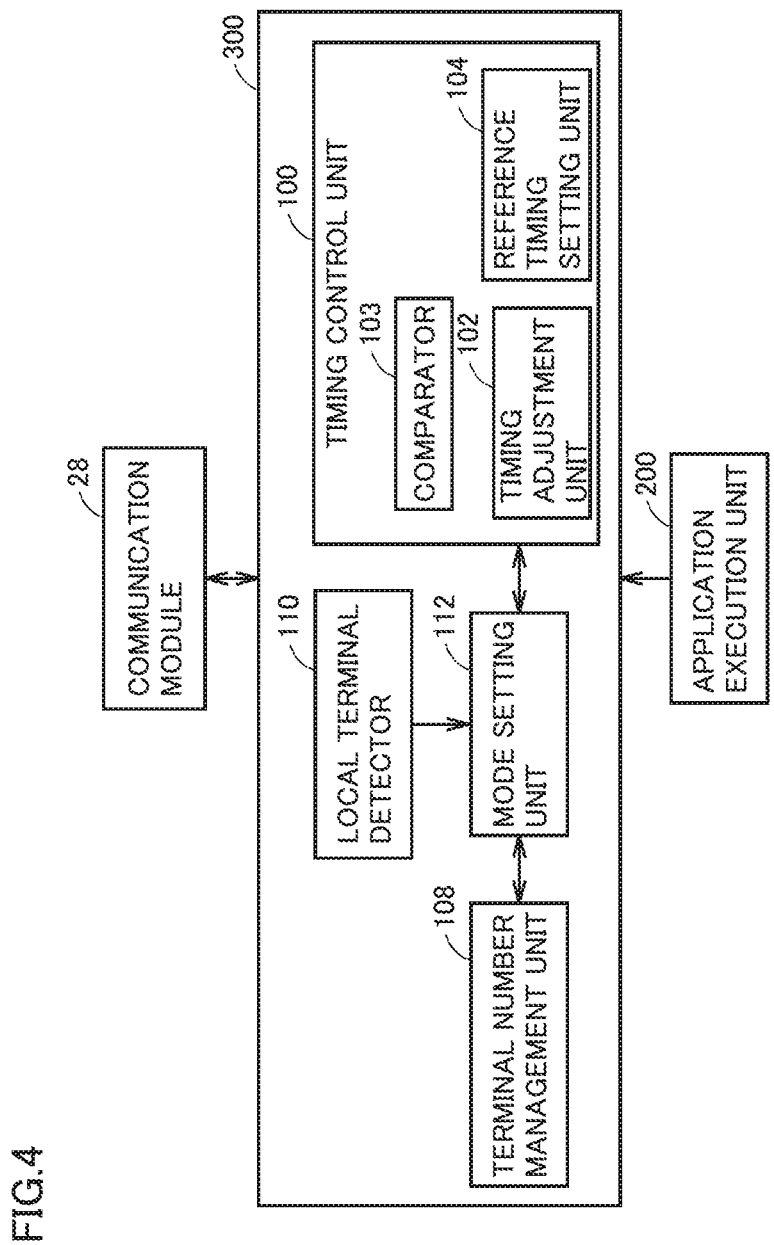
FIG. 4 is a diagram illustrating a functional block for performing communication processing in information processing apparatus main body 5 based on the first embodiment.

FIG. 4 is a diagram illustrating a functional block for performing communication processing in information processing apparatus main body 5 based on the first embodiment.

As shown in FIG. 4, information processing apparatus main body 5 includes a communication control unit 300 and an application execution unit 200. Each functional block is implemented by execution by CPU 10 of various programs stored in flash memory 17.

Communication control unit 300 controls Bluetooth® communication with controller 7 through communication module 28. Communication control unit 300 controls Wi-Fi communication with access point 9 through communication module 28.

Communication control unit 300 includes a timing control unit 100, a mode setting unit 112, a local terminal detector 110, and a terminal number management unit 108.

Timing control unit 100 controls timing of a section of communication through communication module 28.

Timing control unit 100 includes a timing adjustment unit 102, a comparator 103, and a reference timing setting unit 104.

Timing adjustment unit 102 adjusts a communication section in which Bluetooth® communication with controller 7 (which is hereinafter also collectively referred to as a local terminal) through communication module 28 is established.

Reference timing setting unit 104 sets reference timing serving as the reference of start of communication.

Comparator 103 compares communication sections with each other in adjustment of the communication sections and outputs a result of comparison to timing adjustment unit 102.

Though a configuration including timing adjustment unit 102, comparator 103, and reference timing setting unit 104 is described as functions of timing control unit 100 in the present example, timing adjustment unit 102 may be configured to include the function of comparator 103, timing adjustment unit 102 may be configured to include the function of reference timing setting unit 104, or timing adjustment unit 102 can also be configured to include the functions of comparator 103 and reference timing setting unit 104.

Mode setting unit 112 sets various modes (an active mode and a sniff mode) in Bluetooth® communication.

In order to establish connection in Bluetooth® communication, a transmission side (a main body side) and a reception side (a local terminal) should generally be in synchronization with each other in terms of both of time and a frequency.

In this connection, in the active mode in Bluetooth® communication, the local terminal is always in a wake-up state.

There is also a wireless communication scheme in which communication with another apparatus is intermittently established (for example, a wireless communication scheme in which a state of communication that communication with another apparatus is established and a power saving state that communication is not established are alternately repeated). For example, wireless communication in the sniff mode represents one of such wireless communication schemes. In the sniff mode, in order to achieve low power consumption, a local terminal is in a wake-up state for a short time section every 5 ms to 15 ms. The main body side transmits a polling packet in this time section.

A local terminal can synchronize again a clock of the local terminal itself by using this packet. The main body side and the local terminal can maintain synchronization in terms of time and a frequency by periodically exchanging a packet for synchronization again. Thus, frequency hopping communication is enabled.

Local terminal detector 110 detects a local terminal (controller 7) which issues a connection request.

Number management unit 108 manages the number of local terminals which performs communication processing.

Application execution unit 200 performs processing based on an application stored in flash memory 17. Processing based on an application stored in optical disc 4 may be performed, without being limited to flash memory 17.

[b2. Overview of Wireless Communication]

Figure 5:
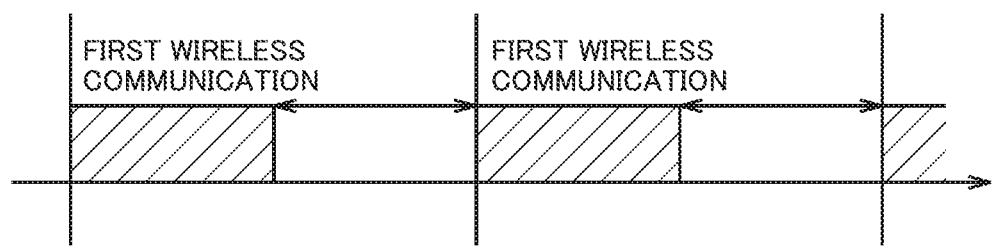
FIG. 5 is a diagram illustrating overview of wireless communication based on the first embodiment.

FIG. 5 is a diagram illustrating overview of wirelessly communicating based on the first embodiment.

As shown in FIG. 5, in the present example, when certain reference timing is set, reference timing with a constant period is set and first wireless communication under Bluetooth® is performed with the reference timing being defined as the reference.

An empty section is created by adjusting first wireless communication under Bluetooth®.

As the empty section is created, another wireless communication standard (for example, Wifi) can be made use of in the empty section. Thus, data collision can be avoided without interference between first wireless communication under Bluetooth® and another wireless communication standard, and an information processing apparatus of which communication quality is satisfactory can be achieved.

[b3. Communication Setting Table]

FIG. 6 is a diagram illustrating a table relating to communication setting information in the sniff mode based on the first embodiment.

FIG. 6 shows a table showing a plurality of pieces of communication setting information in Bluetooth® communication in the sniff mode. In the present example, eleven pieces of communication setting information are provided and an identifier is provided for each of them. Specifically, pieces of communication setting information to which identifiers TSI0 to TSI10 (which are also collectively referred to as an identifier transmission scheme index (table) (TSI)) are allocated are shown.

In the sniff mode, a polling packet is transmitted from the main body side to a local terminal and the local terminal receives the polling packet and thereafter transmits data to the main body side. In the sniff mode, an amount of data transmitted together with the polling packet from the main body side to the local terminal is defined in accordance with an identifier TSI. In the present example, an amount of data is defined as the number of slots in a downlink from the main body side to a local terminal. The number of slots represents the maximum number of slots in which transmission can be performed.

On a side of the local terminal, an amount of data transmitted from the local terminal to the main body side is defined in accordance with an identifier TSI. In the present example, an amount of data is defined as the number of slots in an uplink from the local terminal to the main body side. The number of slots represents the maximum number of slots in which transmission can be performed.

Communication setting information corresponding to identifier TSI0 includes data in which the number of connectable local terminals (the maximum number of connectable terminals) is set to "2", the number of slots in an uplink for data from the local terminal to the main body side (the maximum number of slots in which communication can be established) is set to "3", the number of slots in a downlink for data from the main body side to the local terminal (the maximum number of slots in which communication can be established) is set to "3", and a sniff interval representing a periodic communication interval is set to "10" (ms). One slot is set to a section of 625 µs.

Communication setting information corresponding to identifier TSI1 includes data in which the maximum number of connectable terminals is set to "4", the number of slots in an uplink is set to "1", the number of slots in a downlink is set to "1", and a sniff interval is set to "5" (ms).

Communication setting information corresponding to identifier TSI2 includes data in which the maximum number of connectable terminals is set to "4", the number of slots in an uplink is set to "1", the number of slots in a downlink is set to "3", and a sniff interval is set to "10" (ms).

Communication setting information corresponding to identifier TSI3 includes data in which the maximum number of connectable terminals is set to "4", the number of slots in an uplink is set to "1", the number of slots in a downlink is set to "5", and a sniff interval is set to "15" (ms).

Communication setting information corresponding to identifier TSI4 includes data in which the maximum number of connectable terminals is set to "4", the number of slots in an uplink is set to "3", the number of slots in a downlink is set to "1", and a sniff interval is set to "10" (ms).

Communication setting information corresponding to identifier TSI5 includes data in which the maximum number of connectable terminals is set to "4", the number of slots in an uplink is set to "3", the number of slots in a downlink is set to "3", and a sniff interval is set to "15" (ms).

Communication setting information corresponding to identifier TSI6 includes data in which the maximum number of connectable terminals is set to "4", the number of slots in an uplink is set to "5", the number of slots in a downlink is set to "1", and a sniff interval is set to "15" (ms).

Communication setting information corresponding to identifier TSI7 includes data in which the maximum number of connectable terminals is set to "6", the number of slots in an uplink is set to "1", the number of slots in a downlink is set to "3", and a sniff interval is set to "15" (ms).

Communication setting information corresponding to identifier TSI8 includes data in which the maximum number of connectable terminals is set to "6", the number of slots in an uplink is set to "3", the number of slots in a downlink is set to "1", and a sniff interval is set to "15" (ms).

Communication setting information corresponding to identifier TSI9 includes data in which the maximum number of connectable terminals is set to "8", the number of slots in an uplink is set to "1", the number of slots in a downlink is set to "1", and a sniff interval is set to "10" (ms).

Communication setting information corresponding to identifier TSI10 includes data in which the maximum number of connectable terminals is set to "8", the number of slots in an uplink is set to "1", the number of slots in a downlink is set to "1", and a sniff interval is set to "15" (ms).

By designating communication setting information, a synchronous communication scheme in the sniff mode is set. An identifier TSI is designated in response to an instruction from application execution unit 200.

An identifier TSI is designated based on a type of an application and whether or not an event has occurred.

Pieces of communication setting information labeled with identifiers TSI0 to TSI10 are different from one another in the maximum number of connectable terminals, the number of slots, and a sniff interval.

Values for the "maximum number of connectable terminals," the "number of slots," and the "sniff interval" shown in the table are set such that a slot based on the reference timing does not overlap with a slot based on next reference timing.

When the maximum number of connectable terminals is desirably increased in accordance with a type of an application, an identifier TSI for setting fewer slots and a longer sniff interval can be set. When a shorter sniff interval is desirably set, an identifier TSI for setting fewer slots and a smaller maximum number of connectable terminals may be set.

[b4. Setting of Slot]

Figure 7:
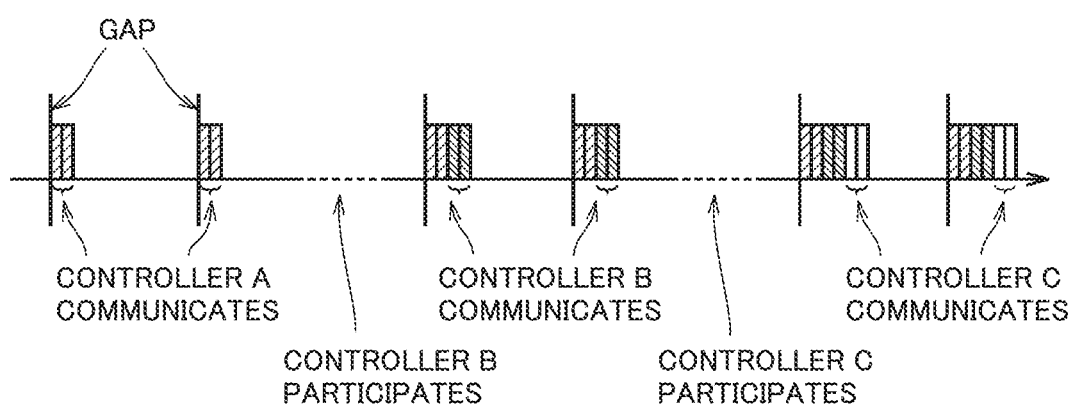
FIG. 7 is a diagram illustrating adjustment of timing in Bluetooth® communication in the sniff mode.

FIG. 7 is a diagram illustrating adjustment of timing in Bluetooth® communication in the sniff mode.

As shown in FIG. 7, a group anchor point GAP is set as reference timing. In the present example, group anchor point GAP represents reference timing in communication processing between the main body side and a plurality of local terminals. With group anchor point GAP being defined as the reference timing, timing of communication with each local terminal is defined.

In the present example, a communication section for a controller A is set with group anchor point GAP being defined as the reference. In the present example, first and second slots with group anchor point GAP being defined as the reference are set as communication sections for controller A.

Then, a controller B participates. A communication section for controller B is set as being adjacent to the communication sections for controller A in accordance with group anchor point GAP. In the present example, third and fourth slots with group anchor point GAP being defined as the reference are set as communication sections for controller B. Timing is adjusted such that a time point of end of the communication sections for controller A is substantially continuous to a time point of start of the communication sections for controller B.

Substantially encompasses not only an example in which a time point of end and a time point of start exactly match with each other but also an example in which there is a slight time lag therebetween.

Then, a controller C participates. A communication section for controller C is set as being adjacent to the communication sections for controller B in accordance with group anchor point GAP. In the present example, fifth and sixth slots are set as communication sections for controller C with group anchor point GAP being defined as the reference. Timing is adjusted such that a time point of end of the communication sections for controller B is substantially continuous to a time point of start of the communication sections for controller C.

Therefore, since communication sections for controllers A to C are arranged as being set continuously in accordance with group anchor point GAP, communication sections in Bluetooth® communication in the sniff mode for local terminals are set in a group.

Remaining communication sections can thus be made use of as communication sections for another type of communication. Interference between Bluetooth® communication and another type of communication can thus readily be avoided and data can efficiently be communicated.

Though a scheme in which group anchor point GAP is set as the reference and a communication section for each controller is set with group anchor point GAP being defined as the reference is described in the present example, instead of setting group anchor point GAP as the reference, an anchor point can also be set as the reference for each controller and a communication section can also be set in accordance with each anchor point.

Though a configuration in which each of controllers A to C communicates with the main body side in the communication sections set with timing being adjusted is described in the present example, it is not necessary to communicate data by using all of the set communication sections. When an amount of data to be communicated is small, only some, for example, one slot, of communication sections consisting of two slots may be used to communicate data with the main body side. This is also applicable to other examples.

[C. Description of Flow]

[c1. Main Communication Processing in Information Processing Apparatus Main Body 5]

Main communication processing in information processing apparatus main body 5 (main body side) will be described.

Figure 8:
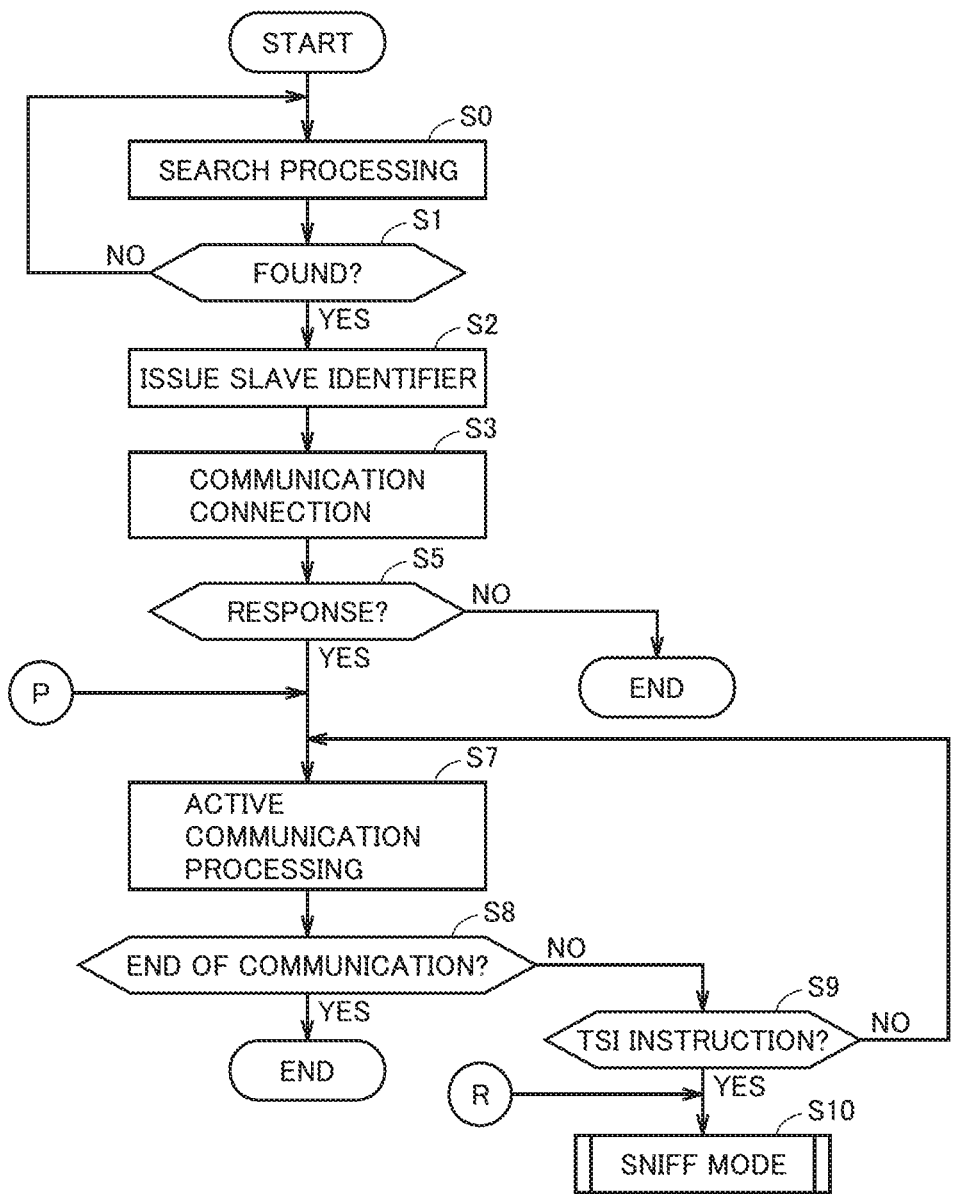
FIG. 8 is a flowchart illustrating main communication processing in information processing apparatus main body 5 (a main body side) based on the first embodiment.

FIG. 8 is a flowchart illustrating main communication processing in information processing apparatus main body 5 (main body side) based on the first embodiment.

Referring to FIG. 8, the main body side performs search processing (step S0). Local terminal detector 110 performs search processing for detecting a local terminal which issues a connection request. The search processing is performed in a section on the main body side where communication is not established (a section of an empty slot). Specifically, local terminal detector 110 performs page scan in the section of the empty slot. Local terminal detector 110 determines whether or not it receives page from a local terminal during page scan. For example, when an operation button in controller 7 which participates is pressed, page is transmitted to the main body side.

When local terminal detector 110 receives page from controller 7 during page scan, it transmits a response packet to controller 7 as acknowledgment.

When controller 7 receives the response packet, it transmits a frequency hop synchronization (FHS) packet including a Bluetooth® address and clock information to the main body side.

Then, the main body side determines whether or not it has found a local terminal (step S1). Local terminal detector 110 determines that it has found controller 7 by receiving the FHS packet. Local terminal detector 110 notifies mode setting unit 112 of finding. When the main body side determines in step S1 that it does not find a controller (NO in step S1), it continues search processing in step S0.

When the main body side determines in step S1 that it has found a local terminal (YES in step S1), it issues a slave identifier for specifying a local terminal (step S2). Specifically, mode setting unit 112 issues a slave identifier of three bits.

The main body side issues a slave identifier and thereafter establishes communication connection (step S3). Specifically, mode setting unit 112 transmits an ID packet including the slave identifier to the local terminal. The local terminal responds to the ID packet from the main body side.

Then, the main body side determines whether or not it receives a response from the local terminal (step S5). Mode setting unit 112 determines whether or not it has received a response from the local terminal.

When mode setting unit 112 receives a response to the ID packet from the local terminal, it transmits an FHS packet including a Bluetooth® address and clock information of the main body side itself to the local terminal. Thus, preparation for synchronous communication between the main body side and the local terminal is completed. Frequency hopping communication is enabled.

At this stage, processing for what is called slave-master role switching is performed as necessary so that controller 7 is set as the slave and the main body side (that is, information processing apparatus main body 5) is set as the master.

When the main body side determines in step S5 that it receives a response from the local terminal (YES in step S5), it performs processing for communicating with the local terminal in an active mode (step S7).

Mode setting unit 112 sets a communication mode in an initial state to the active mode in relation with the local terminal which has responded and performs communication processing. In the present example, in communication with a plurality of local terminals, a communication mode can be set in relation with each local terminal. Therefore, the main body side can communicate in the active mode with a certain local terminal and communicate in another mode with another local terminal.

Communication processing in the active mode is such that a local terminal is always in a wake-up state and transmits a packet in response to a polling packet from the main body side.

When the main body side determines in step S5 that it does not receive a response from a local terminal (NO in step S5), the process ends (end).

The main body side determines whether or not communication has ended (step S8).

When the main body side determines in step S8 that communication has ended (YES in step S8), the process ends (end).

When the main body side determines in step S8 that communication has not ended (NO in step S8), it determines whether or not it receives an instruction of an identifier TSI (step S9). Mode setting unit 112 determines whether or not it receives an instruction of an identifier TSI designating the sniff mode from application execution unit 200 described with reference to FIG. 6.

When the main body side determines in step S9 that it receives an instruction of an identifier TSI (YES in step S9), it performs processing for making transition to the sniff mode (step S10). Details of processing for making transition to the sniff mode will be described later.

When the main body side determines in step S9 that it does not receive an instruction of an identifier TSI (NO in step S9), the process returns to step S7 and communication processing in the active mode is continued.

[c2. Processing for Making Transition to Sniff Mode in Information Processing Apparatus Main Body 5]

Figure 9:
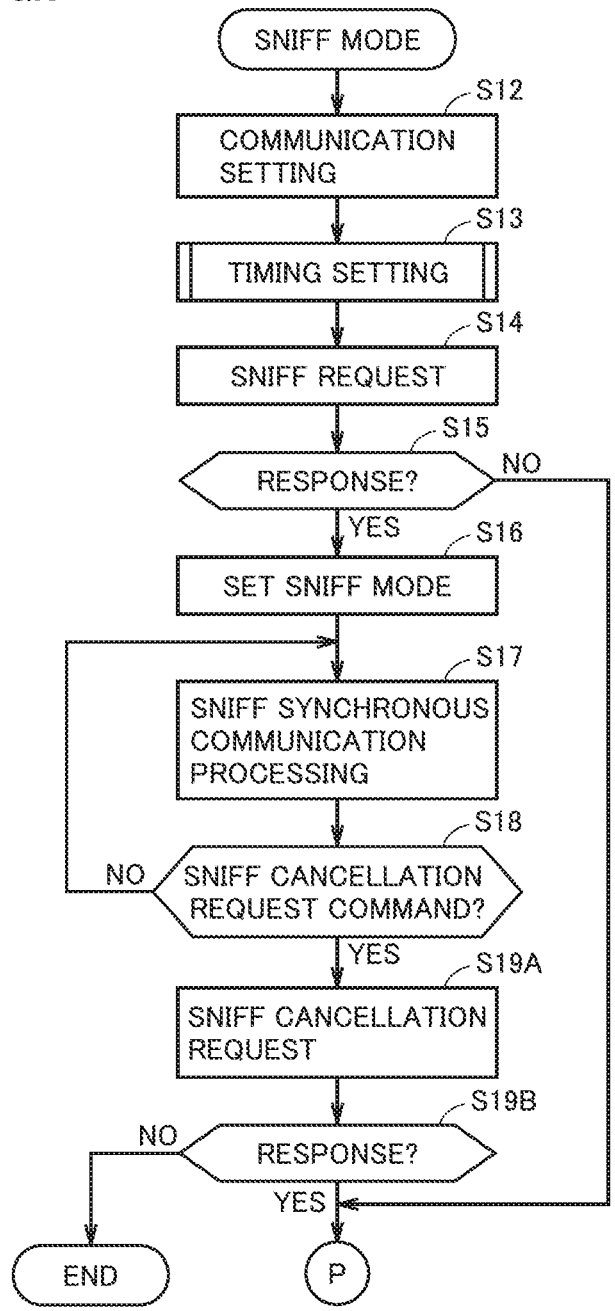
FIG. 9 is a flowchart illustrating processing for making transition to the sniff mode in information processing apparatus main body 5 based on the first embodiment.

FIG. 9 is a flowchart illustrating processing for making transition to the sniff mode in information processing apparatus main body 5 based on the first embodiment.

As shown in FIG. 9, the main body side makes communication setting in accordance with an identifier TSI (step S12). Specifically, mode setting unit 112 makes communication setting based on communication setting information in accordance with an identifier TSI. For example, when application execution unit 200 indicates identifier TSI0, mode setting unit 112 makes communication setting as described with reference to FIG. 6 such that the number of connectable local terminals (the number of connectable terminals) is "2", for setting the number of slots, the number of uplinks for data from the local terminal to the main body side is set to "3" and the number of downlinks for data from the main body side to the local terminal is set to "3", and a sniff interval representing a periodic communication interval is set to "10" (ms). Mode setting unit 112 gives terminal number management unit 108 information on the number of connectable local terminals (the number of connectable terminals). Number management unit 108 manages the number of connectable terminals upon receiving the information.

Then, the main body side sets timing (step S13). Mode setting unit 112 instructs timing control unit 100 to control timing of communication with the local terminal. Details of timing setting will be described later.

Then, the main body side transmits a sniff request to the local terminal (step S14). Mode setting unit 112 transmits a sniff request to the local terminal. Details of data of a sniff request will be described later. In accordance with the sniff request, the local terminal in the active mode is set to the sniff mode so that synchronous communication with the main body side in the sniff mode is enabled. Identifier TSI data and timing information of a local terminal which has already established synchronous communication in the sniff mode are updated in accordance with the sniff request and synchronous communication in the updated sniff mode is enabled.

Then, the main body side determines whether or not it receives a response from the local terminal (step S15). Mode setting unit 112 determines whether or not it has received a response from the local terminal.

When the main body side determines in step S15 that it receives a response from the local terminal (YES in step S15), it sets the sniff mode (step S16).

Mode setting unit 112 changes the communication mode from the active mode to the sniff mode in relation with the local terminal which has responded. In the present example, in communication with a plurality of local terminals, a communication mode can be set in relation with each local terminal. Therefore, the main body side can be in communication in the active mode with a certain local terminal and in synchronous communication in the sniff mode with another local terminal.

Then, processing for synchronous communication in the sniff mode between the main body side and the local terminal is performed (step S17). Synchronous communication processing in the sniff mode realizes low power consumption. In order to realize low power consumption, a local terminal is in a wake-up state for a short time section every 5 to 15 ms. The main body side transmits a polling packet in this time section. A local terminal transmits a packet including the number of slots in accordance with the designated communication setting information.

Then, the main body side determines whether or not it receives a sniff cancellation request command (step S18). Mode setting unit 112 determines whether or not it has received a sniff cancellation request command which indicates setting of the active mode from application execution unit 200.

When the main body side determines in step S18 that it receives a sniff cancellation request command (YES in step S18), it transmits a sniff cancellation request to the local terminal (step S19A). Mode setting unit 112 transmits a sniff cancellation request to the designated local terminal.

Then, the main body side determines whether or not it receives a response from the local terminal (step S19B). Mode setting unit 112 determines whether or not it receives a response from the local terminal.

When the main body side determines in step S19B that it receives a response from the local terminal (YES in step S19B), the process proceeds to "P", that is, returns to step S7 in FIG. 8. When mode setting unit 112 determines that it receives a response from the local terminal, it sets the active mode in relation with the designated local terminal. When all local terminals are designated and responses from all local terminals are obtained, the active mode is set in relation with all the local terminals.

As described with reference to step S7, the main body side performs processing for communicating with the local terminals in the active mode.

When the main body side determines in step S19B that it does not receive a response from the local terminal (NO in step S19B), the process ends (end).

When the main body side determines in step S18 that it does not receive a sniff cancellation request command (NO in step S18), the process returns to step S17 in which synchronous communication processing in the sniff mode is continued.

When the main body side determines in step S15 that it does not receive a response from the local terminal (NO in step S15), the process proceeds to "P" without entering the sniff mode, that is, returns to step S7 in FIG. 8. Mode setting unit 112 quits the processing for making transition to the sniff mode.

[c3. Setting of Timing in Information Processing Apparatus Main Body 5]

Figure 10:
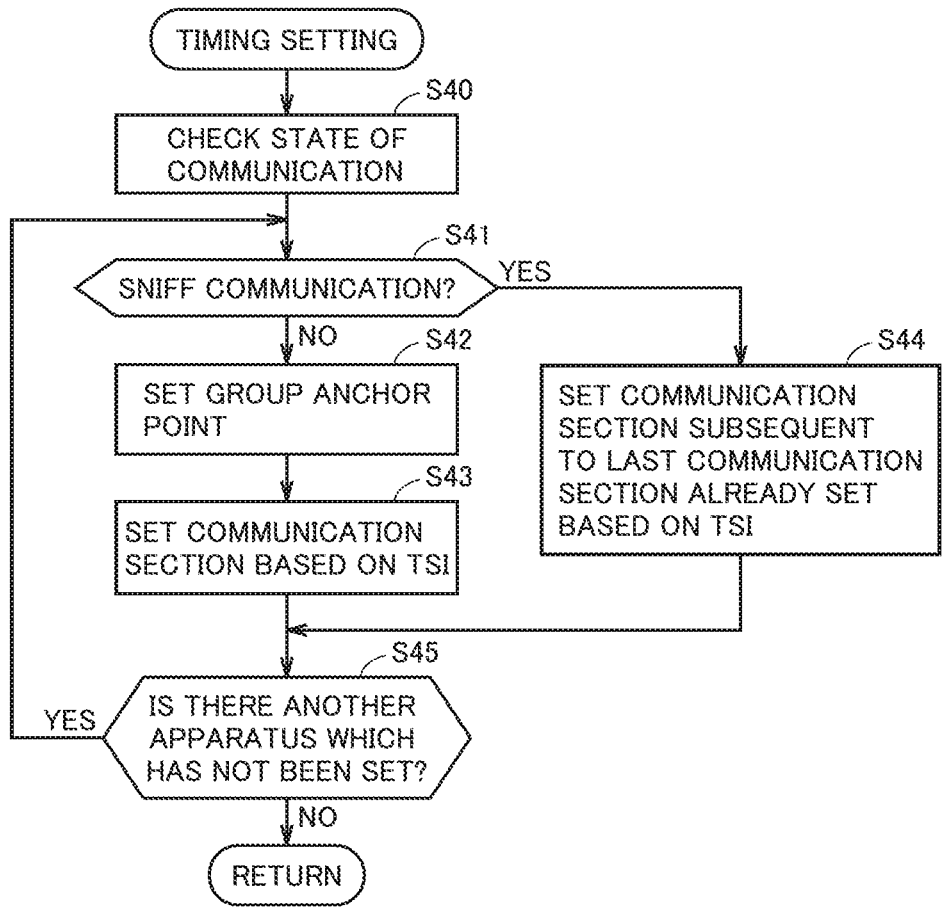
FIG. 10 is a flowchart illustrating setting of timing in information processing apparatus main body 5 based on the first embodiment.

FIG. 10 is a flowchart illustrating setting of timing in information processing apparatus main body 5 based on the first embodiment.

As shown in FIG. 10, the main body side checks a state of communication (step S40). Timing adjustment unit 102 checks a state of communication with at least one local terminal.

Then, the main body side determines whether or not synchronous communication processing in the sniff mode (sniff communication) has already been set (step S41). Specifically, timing adjustment unit 102 determines whether or not there has already been a local terminal which is performing synchronous communication processing in the sniff mode.

When the main body side determines in step S41 that synchronous communication processing in the sniff mode has not been set (NO in step S41), it sets a group anchor point defined as reference timing in executing the sniff mode (step S42). Reference timing setting unit 104 sets a group anchor point.

Then, the main body side sets a communication section based on an identifier TSI (step S43). Timing adjustment unit 102 sets a communication section based on an identifier TSI. For example, when application execution unit 200 designates identifier TSI0, timing adjustment unit 102 sets sections of six slots in total in which the number of uplinks is "3" and the number of downlinks is "3" as communication sections.

Then, the process proceeds to step S45.

When the main body side determines in step S41 that synchronous communication processing in the sniff mode has been set (YES in step S41), it sets a communication section subsequent to a last communication section which has already been set based on an identifier TSI (step S44).

When timing adjustment unit 102 determines that there has already been a local terminal which is performing synchronous communication processing in the sniff mode, it sets a communication section subsequent to the last communication section which has already been set. For example, when application execution unit 200 designates identifier TSI0, sections of six slots in total in which the number of uplinks is "3" and the number of downlinks is "3" are set as communication sections so as to be continuous to the last communication section.

Then, the process proceeds to step S45.

In step S45, the main body side determines whether or not there is another apparatus of which communication section has not been set in synchronous communication processing in the sniff mode. Specifically, timing adjustment unit 102 determines whether or not there is another apparatus of which communication section has not been set.

When the main body side determines in step S45 that there is another apparatus of which communication section has not been set (YES in step S45), the process returns to step S41 in which the processing the same as above is repeated. That is, a communication section is set. Other apparatuses of which communication section has not been set include both of a local terminal which performs communication processing in the active mode and a local terminal which performs synchronous communication processing in the sniff mode based on an identifier TSI different from an indicated identifier TSI.

When the main body side determines in step S45 that there is no other apparatus of which communication section has not been set (NO in step S45), the process ends (return).

Based on setting of timing, with setting of a group anchor point, a communication section for each local terminal is set.

In the example in FIG. 7, identifier TSI9 (the number of slots for an uplink being set to "1" and the number of downlinks being set to "1") is designated. In setting of timing for controller A, group anchor point GAP is set. Then, communication sections in which the number of slots is "2" are set for controller A with group anchor point GAP being defined as the reference. In the present example, first and second slots are set as communication sections for controller A with group anchor point GAP being defined as the reference.

Then, communication sections in which the number of slots is "2" is set for controller B subsequent to the communication sections for controller A with group anchor point GAP being defined as the reference. In the present example, third and fourth slots are set as communication sections for controller B with group anchor point GAP being defined as the reference.

Then, communication sections in which the number of slots is "2" is set for controller C subsequent to the communication sections for controller B with group anchor point GAP being defined as the reference. In the present example, fifth and sixth slots are set as communication sections for controller C with group anchor point GAP being defined as the reference.

Through the processing, synchronous communication processing in the sniff mode in a plurality of local terminals is performed with group anchor point GAP being defined as the reference. Specifically, communication sections under Bluetooth® in the sniff mode for controllers A to C are set in a group.

Data of a sniff request transmitted from the main body side to a local terminal based on the first embodiment will now be described.

Figure 11:
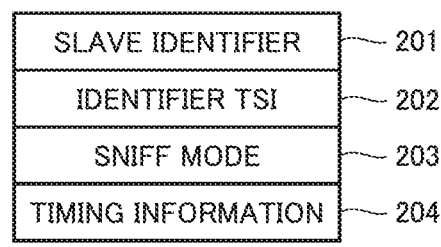
FIG. 11 is a diagram illustrating data of a sniff request based on the first embodiment.

FIG. 11 is a diagram illustrating data of a sniff request based on the first embodiment.

As shown in FIG. 11, data of a sniff request includes slave identifier data 201, identifier TSI data 202, sniff mode data 203, and timing information 204.

Slave identifier data 201 serves for designation of a local terminal of interest. By checking slave identifier data 201, whether received data is packet data destined to a local terminal or packet data destined to another apparatus can be identified.

Identifier TSI data 202 designates an identifier TSI number described with reference to FIG. 6.

The table in FIG. 6 is also stored in flash memory 713 in a local terminal. Therefore, a local terminal obtains communication setting information designated in the table stored in flash memory 713 in accordance with identifier TSI data 202. A local terminal sets the number of slots and a sniff interval based on the obtained and designated communication setting information.

Timing information 204 is information on group anchor point GAP defined as the reference timing and synchronization timing from group anchor point GAP. The timing information is set based on a communication section set by timing adjustment unit 102 described above.

Since communication setting information can be designated by using the same identifier TSI in both of the main body side and a local terminal, the number of slots and a sniff interval can readily be set.

[c4. Main Communication Processing in Local Terminal]

Main communication processing in a local terminal will be described. The local terminal includes controller 7.

Figure 12:
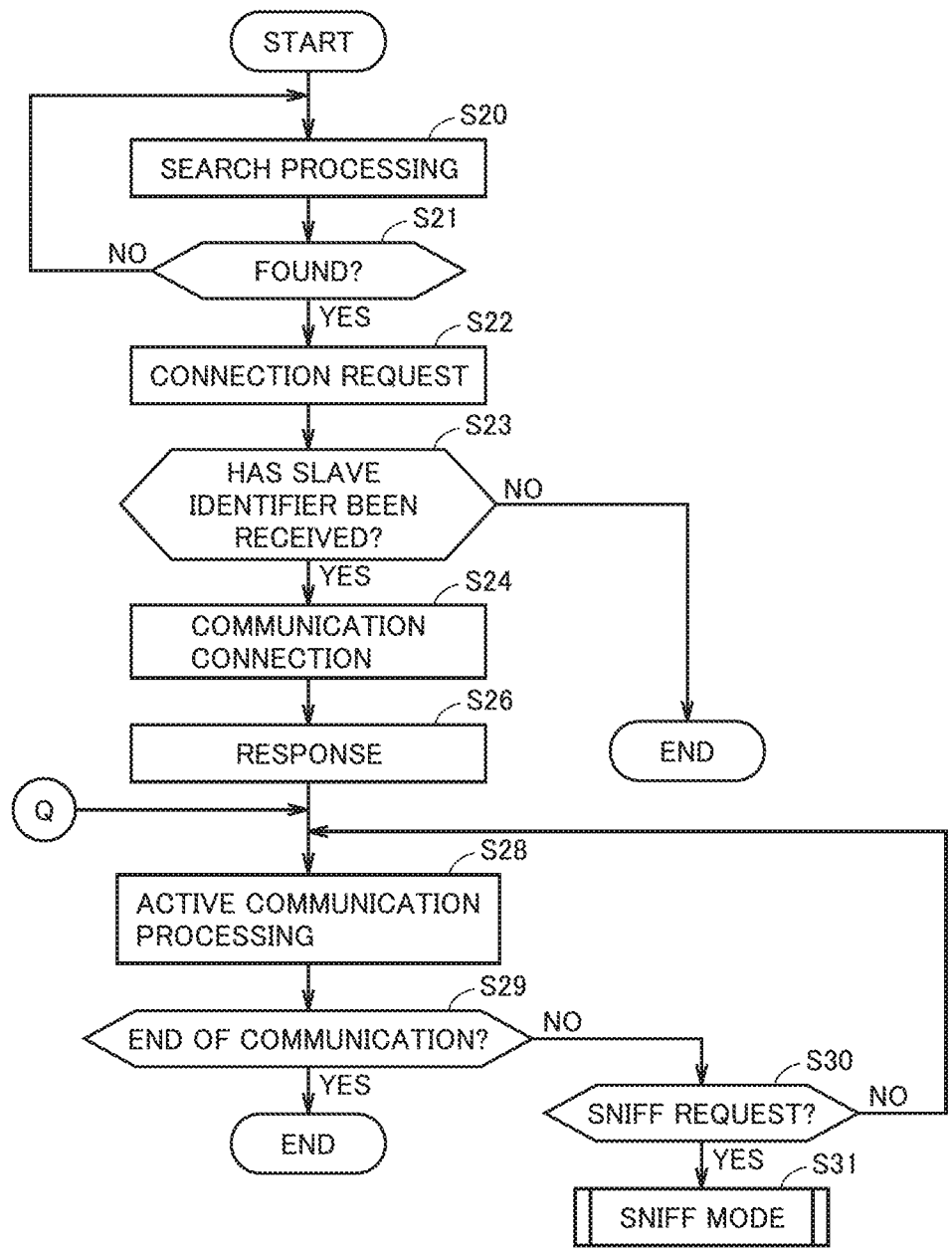
FIG. 12 is a flowchart illustrating main communication processing in a local terminal based on the first embodiment.

FIG. 12 is a flowchart illustrating main communication processing in a local terminal based on the first embodiment.

Referring to FIG. 12, a local terminal performs search processing (step S20). Specifically, the local terminal transmits page. For example, when an operation button in controller 7 which participates in communication is pressed, page is transmitted to the main body side.

Then, the local terminal determines whether or not it has found the main body side (step S21). The local terminal determines whether or not it has received a response packet transmitted from the main body side. When the local terminal determines that it has received a response packet from the main body side, it determines that it has found the main body side.

When the local terminal determines in step S21 that it does not find the main body side (NO in step S21), the process returns to step S20 in which search processing is continued.

When the local terminal determines in step S21 that it has found the main body side (YES in step S21), it issues a connection request (step S22). Specifically, the local terminal transmits a frequency hop synchronization (FHS) packet including a Bluetooth® address and clock information to the main body side.

Then, the local terminal determines whether or not it has received a slave identifier (step S23). The local terminal determines whether or not it has received an ID packet including a slave identifier issued by the main body side.

When the local terminal determines in step S23 that it has received a slave identifier (YES in step S23), it establishes communication connection (step S24).

Then, when the local terminal determines that it has received an ID packet including a slave identifier, it transmits a response (step S26). When the local terminal determines that it has received an ID packet from the main body side, it transmits a response signal to the main body side.

The local terminal receives the FHS packet including the Bluetooth® address and the clock information from the main body side. Thus, preparation for synchronous communication between the main body side and the local terminal is completed. Frequency hopping communication is enabled.

At this stage, processing for what is called slave-master role switching is performed as necessary so that controller 7 is set as the slave and the main body (that is, information processing apparatus main body 5) is set as the master.

When the local terminal determines in step S23 that it does not receive a slave identifier (NO in step S23), the process ends (end).

Then, the local terminal performs processing for communicating in the active mode with the main body side (step S28). In the processing for communicating in the active mode, the local terminal is always in a wake-up state. The local terminal transmits a prescribed packet in response to a polling packet from the main body side.

Then, the local terminal determines whether or not communication has ended (step S29).

When the local terminal determines in step S29 that communication has ended (YES in step S29), the process ends (end).

When the local terminal determines in step S29 that communication has not ended (NO in step S29), it determines whether or not it receives a sniff request (step S30). Specifically, the local terminal determines whether or not it has received data of a sniff request described with reference to FIG. 11 from the main body side.

When the local terminal determines in step S30 that it receives a sniff request (YES in step S30), it performs processing for making transition to the sniff mode (step S31). When the local terminal receives data of a sniff request, it performs processing for making transition to the sniff mode as the communication mode. The sniff mode will be described later.

When the local terminal determines in step S30 that it does not receive a sniff request (NO in step S30), the process returns to step S28 in which communication processing in the active mode is continued. When the local terminal does not receive data of a sniff request, it continues communication processing in the active mode as the communication mode.

[c5. Processing for Making Transition to Sniff Mode in Local Terminal]

Figure 13:
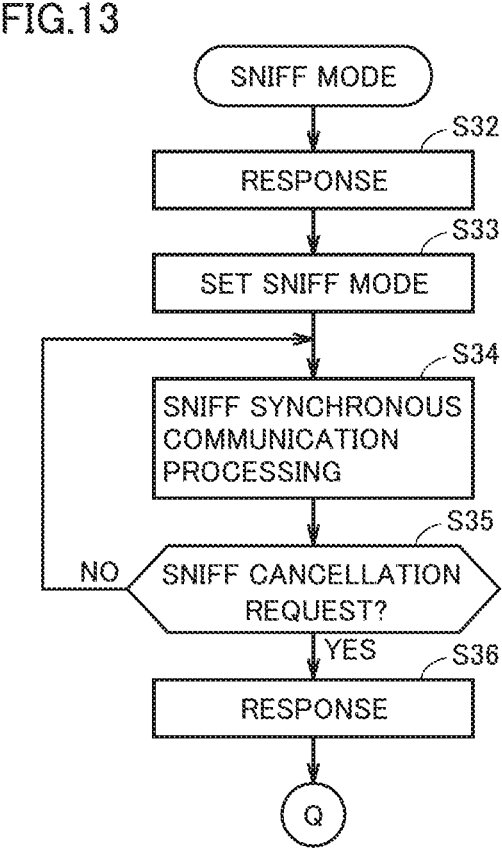
FIG. 13 is a flowchart illustrating processing for making transition to the sniff mode in the local terminal based on the first embodiment.

FIG. 13 is a flowchart illustrating processing for making transition to the sniff mode in the local terminal based on the first embodiment.

As shown in FIG. 13, the local terminal responds when it receives a sniff request (step S32). When the local terminal determines that it has received a sniff request from the main body side, it transmits a response signal to the main body side.

Then, the local terminal sets the sniff mode (step S33). The local terminal sets a communication mode to the sniff mode in accordance with the sniff request described with reference to FIG. 11.

The local terminal sets the number of slots and a sniff interval based on identifier TSI data included in the sniff request.

When the main body side and the local terminal share in advance the number of slots to subsequently be used or when at least the main body side knows in advance the number of slots to be used from now on, it is not necessary to include identifier TSI data in a sniff request and at least information indicating a sniff interval can also be included in a sniff request.

The local terminal sets timing to perform communication processing in the sniff mode based on timing information from group anchor point GAP included in the sniff request.

Then, the local terminal performs synchronous communication processing in the sniff mode (step S34).

In the synchronous communication processing in the sniff mode, in order to realize low power consumption, a local terminal is in a wake-up state for a short time section every 5 to 15 ms. During this time section, the main body side transmits a polling packet. A local terminal receives a polling packet with slots in number in accordance with designated communication setting information from the main body side (or the maximum number of slots shared in advance with the main body side) and transmits a packet with slots in number in accordance with the communication setting information.

Then, the local terminal determines whether or not it receives a sniff cancellation request (step S35). Specifically, the local terminal determines whether or not it has received a sniff cancellation request transmitted from the main body side for quitting the sniff mode and setting the active mode.

When the local terminal determines in step S35 that it receives a sniff cancellation request (YES in step S35), it responds (step S36). When the local terminal determines that it has received a sniff cancellation request from the main body side, it transmits a response signal to the main body side.

Then, the process proceeds to "Q", that is, returns to step S28 in FIG. 12 in which the local terminal changes from the sniff mode to the active mode which is the initial state and performs communication processing in the active mode. Subsequent processing is as described above.

When the local terminal determines in step S35 that it does not receive a sniff cancellation request (NO in step S35), the process returns to step S34 in which synchronous communication processing in the sniff mode is continued.

Second Embodiment

[D. Combination of Plurality of Identifier TSIs]

Combination of identifier TSIs in Bluetooth® communication in the sniff mode based on a second embodiment will be described.

Though controller 7 representing one example of a local terminal is described in the embodiment above, Bluetooth® communication in the sniff mode can also be established with a terminal device of another type being employed as the local terminal, without being limited to controller 7.

Since controller 7 and a terminal device of another type are different from each other in function, an identifier TSI is desirably set in accordance with an amount of data to be handled in establishing Bluetooth® communication in the sniff mode. An identifier TSI is desirably set separately for controller 7 and a terminal device of another type.

FIG. 14 is a diagram illustrating a pattern of combination of identifier TSIs different in type based on the second embodiment.

As shown in FIG. 14, eight combination patterns are shown as combination patterns. An identifier TSI is set for each of two types of local terminals.

By way of example, a local terminal "1" represents a terminal device of another type and a local terminal "2" represents controller 7.

These combination patterns are identical to one another in sniff interval [ms]. Thus, communication processing using the same group anchor point GAP can be performed and communication sections for local terminals can be set in a group.

By setting communication sections in a group, remaining communication sections can be made use of as communication sections for another type of communication. Thus, interference between Bluetooth® communication and another type of communication can readily be avoided and data can efficiently be communicated.

Specifically, a first combination pattern is a pattern of combination between identifier TSI0 and identifier TSI9. A second combination pattern is a pattern of combination between identifier TSI2 and identifier TSI9. A third combination pattern is a pattern of combination between identifier TSI4 and identifier TSI9. A fourth combination pattern is a pattern of combination between identifier TSI3 and identifier TSI10. A fifth combination pattern is a pattern of combination between identifier TSI5 and identifier TSI10. A sixth combination pattern is a pattern of combination between identifier TSI6 and identifier TSI10. A seventh combination pattern is a pattern of combination between identifier TSI7 and identifier TSI10. An eighth combination pattern is a pattern of combination between identifier TSI8 and identifier TSI10.

The number of connectable terminals is set in consideration of a sniff interval. By setting a combination pattern different in identifier TSI, Bluetooth® communication adapted to each controller 7 can be established.

For example, in establishing Bluetooth® communication in the sniff mode, such synchronous communication processing in the sniff mode that identifiers TSI0 to TSI8 are allocated to terminal devices of another type in which an amount of transmitted and received data is large and identifier TSI9 or TSI10 is allocated to controller 7 in which an amount of transmitted and received data is smaller than in terminal devices of another type can be performed.

Efficient Bluetooth® communication in the sniff mode in accordance with a type of a local terminal can be established.

Third Embodiment

Figure 15:
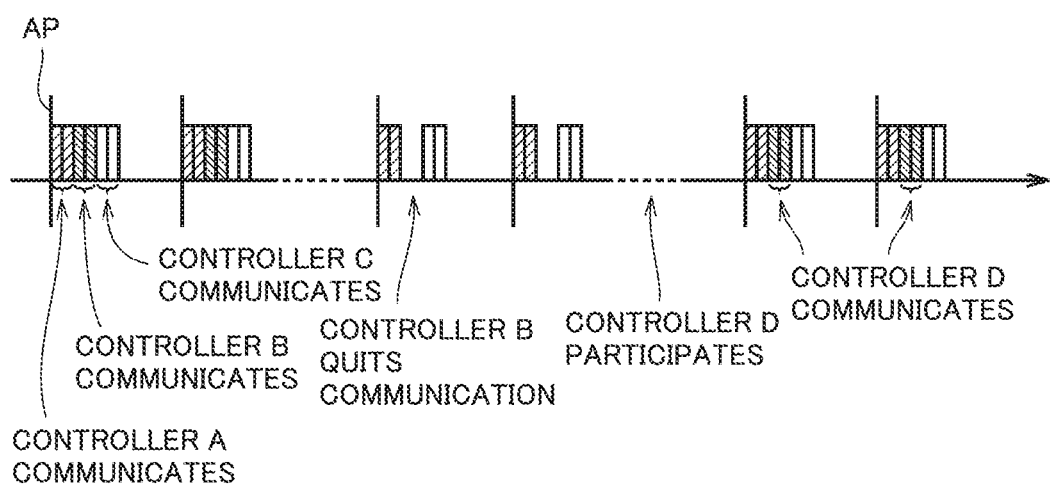
FIG. 15 is a diagram illustrating adjustment of timing in Bluetooth® communication in the sniff mode based on a third embodiment.

FIG. 15 is a diagram illustrating adjustment of timing in Bluetooth® communication in the sniff mode based on a third embodiment.

As shown in FIG. 15, in the present example, Bluetooth® communication in the sniff mode in controllers A to C as three local terminals is established. Controller B quits communication.

Bluetooth® communication in the sniff mode is continued in controller A and controller C as two local terminals. An empty section is present between controller A and controller C.

A controller D participates in communication as a new local terminal.

In the present example, a communication section for controller D is inserted in a section (an empty section) in which controller B performed synchronous communication processing in the sniff mode. Timing is adjusted such that a time point of end of the communication sections for controller A is substantially continuous to a time point of start of a communication section for controller D. Timing is adjusted such that a time point of end of a communication section for controller D is substantially continuous to a time point of start of the communication sections for controller C.

By thus setting the communication sections in one group, remaining communication sections can be made use of as communication sections for another type of communication. Thus, interference between Bluetooth® communication and another type of communication can readily be avoided and data can efficiently be communicated.

Figure 16:
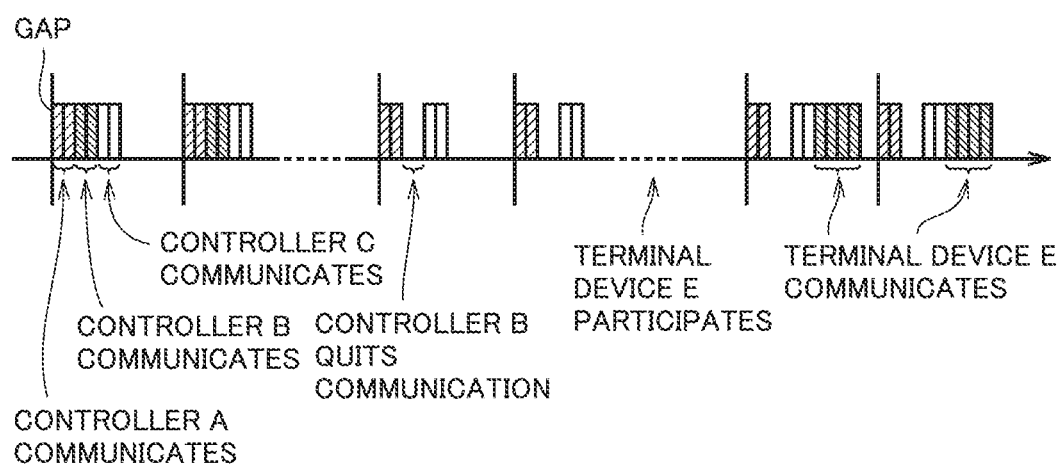
FIG. 16 is a diagram illustrating another type of adjustment of timing in Bluetooth® communication in the sniff mode based on the third embodiment.

FIG. 16 is a diagram illustrating another type of adjustment of timing in Bluetooth® communication in the sniff mode based on the third embodiment.

As shown in FIG. 16, in the present example, Bluetooth® communication in the sniff mode in controllers A to C as three local terminals is established. Controller B quits communication.

Bluetooth® communication in the sniff mode in controller A and controller C as two local terminals is continued. An empty section is present between controller A and controller C.

A terminal device E of another type participates in communication as a new local terminal.

In the present example, a communication section for terminal device E of another type is arranged subsequent to a section in which controller C has been performing synchronous communication processing in the sniff mode.

By way of example, communication sections for terminal device E have the number of slots of "4". Communication sections for controller B have the number of slots of "2".

Since the number of slots in connection with controller B is "2", communication sections for terminal device E having the number of slots of "4" cannot be inserted in the empty section. Therefore, timing of the communication sections for terminal device E is set to be subsequent to the communication sections for controller C. Timing is adjusted such that a time point of end of the communication sections for controller C is substantially continuous to a time point of start of communication sections for terminal device E.

By thus setting the communication sections in one group, remaining communication sections can be made use of as communication sections for another type of communication. Thus, interference between Bluetooth® communication and another type of communication can readily be avoided and data can efficiently be communicated.

[c6. Setting of Timing in Information Processing Apparatus Main Body 5]

Since main communication processing on the main body side and processing for making transition to the sniff mode are basically the same as described with reference to FIGS. 9 and 10, detailed description thereof will not be repeated. Processing in setting timing in step S13 in FIG. 9 is different.

Figure 17:
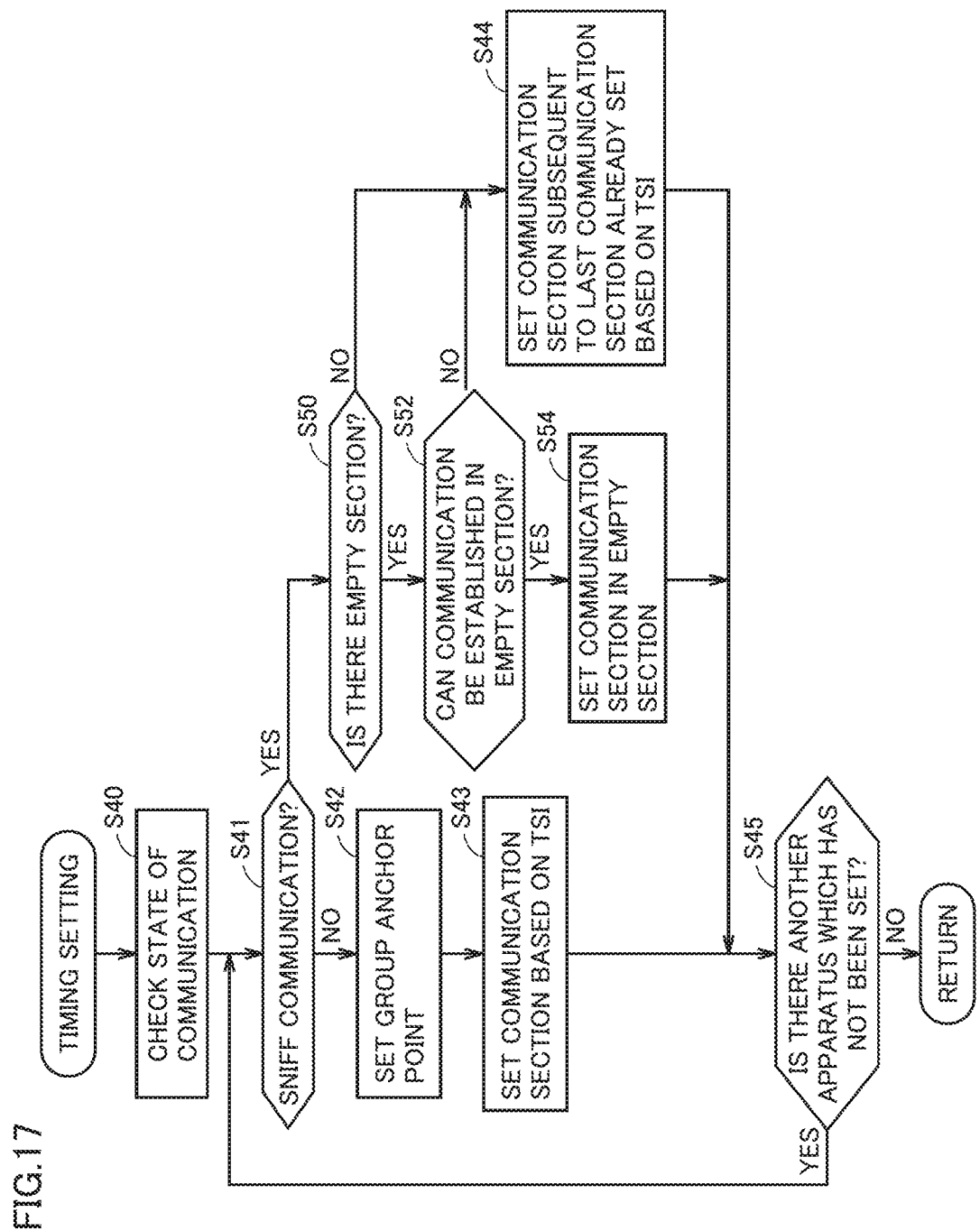
FIG. 17 is a flowchart illustrating setting of timing in information processing apparatus main body 5 based on the third embodiment.

FIG. 17 is a flowchart illustrating setting of timing in information processing apparatus main body 5 based on the third embodiment.

FIG. 17 is different from the flowchart described with reference to FIG. 10 in addition of steps S50 to S54. Since FIG. 17 is otherwise the same, detailed description thereof will not be repeated.

When the main body side determines in step S41 that synchronous communication processing in the sniff mode has been set (YES in step S41), it determines whether or not there is an empty section (step S50). Specifically, timing adjustment unit 102 determines whether or not there is an empty section where communication is not established among communication sections in which synchronous communication processing in the sniff mode is performed.

When the main body side determines in step S50 that there is an empty section (YES in step S50), it determines whether or not communication can be established in the empty section (step S52). Specifically, timing adjustment unit 102 instructs comparator 103 to compare the number of slots in the empty section and the number of slots based on an identifier TSI with each other.

Comparator 103 compares the number of slots in the empty section and the number of slots based on an identifier TSI with each other, and outputs a result of comparison as to whether or not the number of slots based on an identifier TSI is equal to or smaller than the number of slots in the empty section to timing adjustment unit 102.

Timing adjustment unit 102 determines whether or not communication can be established in the empty section based on the result of comparison.

When the main body side determines in step S52 that communication can be established in the empty section (YES in step S52), it sets a communication section in the empty section (step S54). When timing adjustment unit 102 determines that the number of slots based on an identifier TSI is equal to or smaller than the number of slots in the empty section, it sets a communication section in the empty section. For example, when the number of slots in the empty section is "2" and the number of slots based on an identifier TSI is also "2" as shown in the example in FIG. 15, communication sections are set in the empty section.

Then, the process proceeds to step S45.

When the main body side determines in step S50 that there is no empty section (NO in step S50), it sets a communication section subsequent to the last communication section which has already been set based on an identifier TSI (step S44). Then, the process proceeds to step S45. Subsequent processing is the same.

When the main body side determines in step S52 that communication cannot be established in the empty section (NO in step S52), the process proceeds to step S44. When timing adjustment unit 102 determines that the number of slots based on an identifier TSI is not equal to or smaller than the number of slots in the empty section in accordance with the result of comparison by comparator 103, the process proceeds to step S44 in which a communication section is set subsequent to the last communication section which has already been set based on an identifier TSI.

For example, when the number of slots in the empty section is "2" and the number of slots based on an identifier TSI is "4" as shown in the example in FIG. 16, communication sections are set subsequent to the last communication section.

Through the processing, a communication section for another local terminal can be inserted in an empty section among all communication sections in Bluetooth® communication in the sniff mode and waste of the empty section can be suppressed. By setting the communication sections in one group, remaining communication sections can be made use of as communication sections for another type of communication. Thus, interference between Bluetooth® communication and another type of communication can readily be avoided and data can efficiently be communicated.

First Modification of Third Embodiment

In the third embodiment, when it is determined that a communication section cannot be inserted in an empty section, a communication section is set subsequent to the last communication section. In such a case, re-adjustment processing for resetting a communication section and setting a communication section again may be performed.

[c7. Setting of Timing in Information Processing Apparatus Main Body 5]

Figure 18:
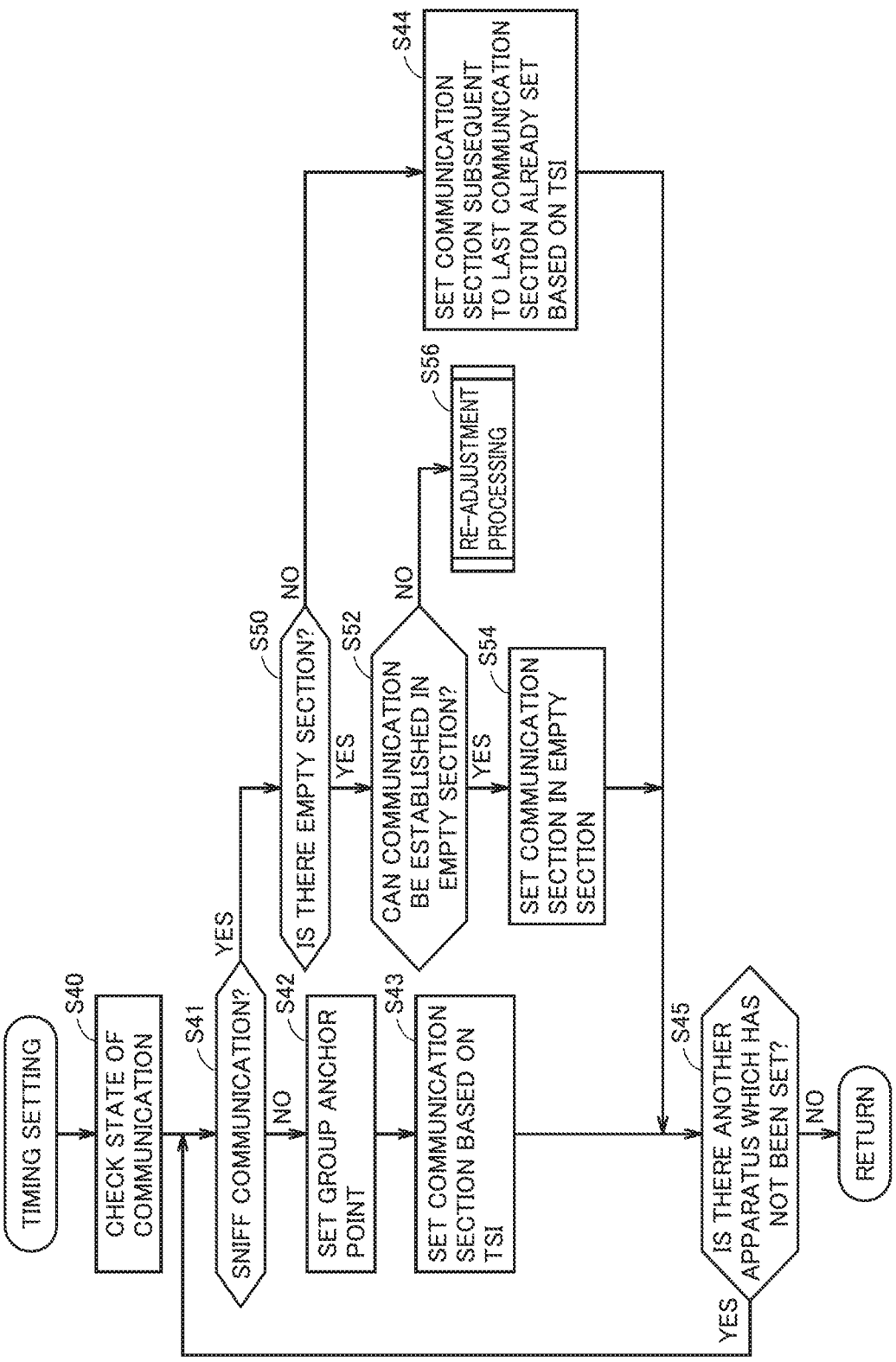
FIG. 18 is a flowchart illustrating setting of timing in information processing apparatus main body 5 based on a first modification of the third embodiment.

FIG. 18 is a flowchart illustrating setting of timing in information processing apparatus main body 5 based on a first modification of the third embodiment.

FIG. 18 is different from the flowchart in FIG. 17 in addition of re-adjustment processing in step S56. Since processing is otherwise the same as described with reference to FIGS. 10 and 17, detailed description thereof will not be repeated.

In step S52, the main body side determines whether or not communication can be established in an empty section. Specifically, timing adjustment unit 102 instructs comparator 103 to compare the number of slots in the empty section and the number of slots based on an identifier TSI with each other.

Comparator 103 compares the number of slots in the empty section and the number of slots based on an identifier TSI with each other, and outputs a result of comparison as to whether or not the number of slots based on an identifier TSI is equal to or smaller than the number of slots in the empty section to timing adjustment unit 102.

Timing adjustment unit 102 determines whether or not communication can be established in the empty section based on the result of comparison.

When the main body side determines in step S52 that communication can be established in the empty section (YES in step S52), it sets a communication section in the empty section (step S54). When timing adjustment unit 102 determines that the number of slots based on an identifier TSI is equal to or smaller than the number of slots in the empty section, it sets a communication section in the empty section.

When the main body side determines in step S52 that communication cannot be established in the empty section (NO in step S52), its performs re-adjustment processing (step S56).

Specifically, timing adjustment unit 102 instructs mode setting unit 112 to perform re-adjustment processing.

[c8. Re-Adjustment Processing in Information Processing Apparatus Main Body 5]

Figure 19:
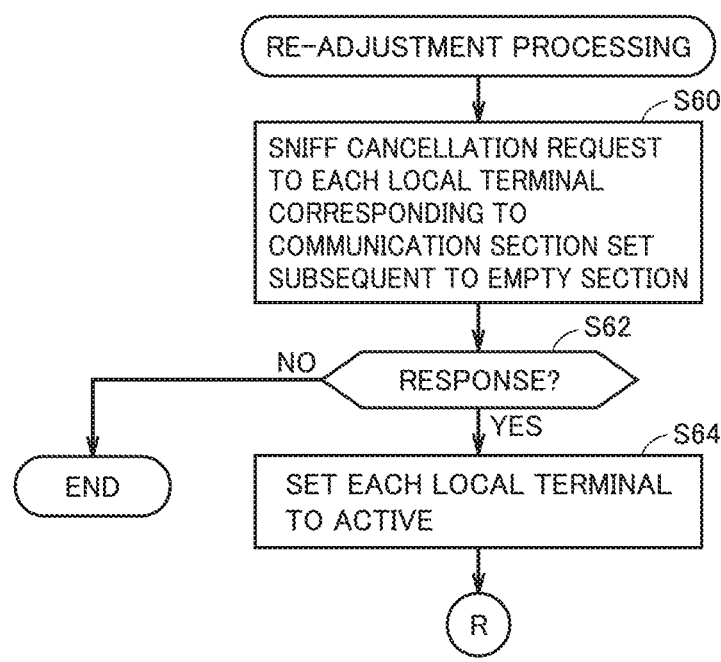
FIG. 19 is a flowchart illustrating re-adjustment processing in information processing apparatus main body 5 based on the first modification of the third embodiment.

FIG. 19 is a flowchart illustrating re-adjustment processing in information processing apparatus main body 5 based on the first modification of the third embodiment.

Referring to FIG. 19, the main body side transmits a sniff cancellation request to each local terminal corresponding to a communication section set subsequent to the empty section (step S60). Mode setting unit 112 transmits a sniff cancellation request for quitting the sniff mode and setting the active mode to each local terminal corresponding to the communication section set subsequent to the empty section.

Then, the main body side determines whether or not it receives a response from each local terminal (step S62). Mode setting unit 112 determines whether or not it has received a response from each local terminal.

When the main body side determines in step S62 that it receives a response from each local terminal (YES in step S62), it quits the sniff mode and sets the active mode for each local terminal (step S64). Then, the process proceeds to "R".

In "R", processing for making transition to the sniff mode in step S10 in FIG. 8 is performed.

In setting of timing in step S13 in the sniff mode, a communication section for each local terminal is set again in accordance with a procedure the same as described with reference to FIG. 9.

The main body side transmits a sniff request of which timing information has been updated to each local terminal.

The main body side determines whether or not it receives a response from each local terminal, and when it determines that it receives a response, it sets the sniff mode. Mode setting unit 112 sets the sniff mode in relation with each local terminal which has responded.

Synchronous communication processing in the sniff mode between the main body side and each local terminal is performed.

Figure 20:
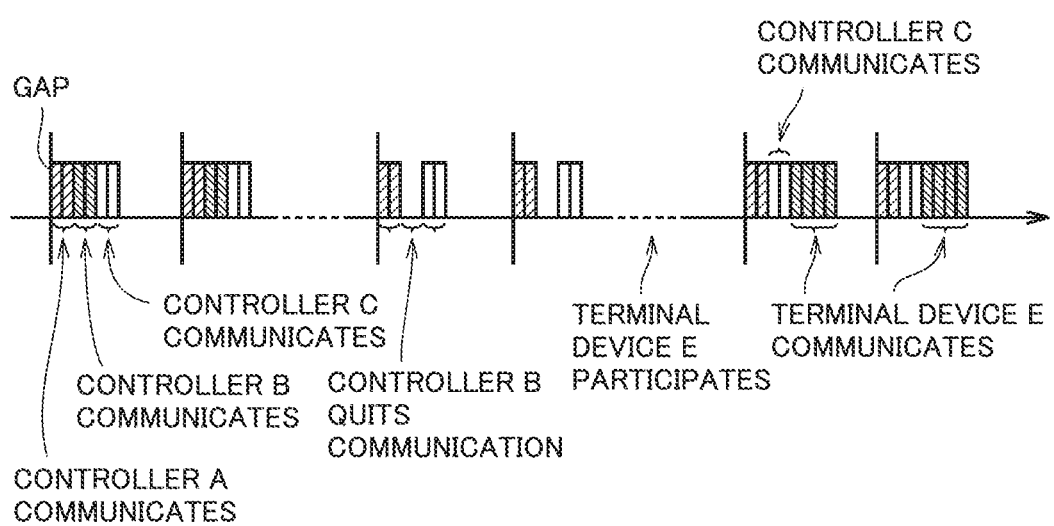
FIG. 20 is a diagram illustrating adjustment of timing in Bluetooth® communication in the sniff mode based on the first modification of the third embodiment.

FIG. 20 is a diagram illustrating adjustment of timing in Bluetooth® communication in the sniff mode based on the first modification of the third embodiment.

As shown in FIG. 20, in the present example, Bluetooth® communication in the sniff mode in controllers A to C as three local terminals is established. Controller B quits communication.

Bluetooth® communication in the sniff mode in controller A and controller C as two local terminals is continued. An empty section is present between controller A and controller C.

Terminal device E participates in communication as a new local terminal.

In the present example, communication sections for terminal device E have the number of slots of "4". Communication sections for controller B have the number of slots of "2".

Since the number of slots in connection with controller B is "2", communication sections for terminal device E having the number of slots of "4" cannot be inserted in the empty section.

Therefore, re-adjustment processing is performed. Specifically, controller C is set to the active mode and communication sections are set again as being adjacent to the communication sections for controller A. Communication sections for terminal device E are also set as being adjacent to the communication sections for controller C.

By thus performing re-adjustment processing when a communication section for another local terminal cannot be inserted in an empty section among all communication sections for Bluetooth® communication in the sniff mode, waste of an empty section can be suppressed and communication processing can be continued without discontinuity.

By setting communication sections in one group, remaining communication sections can be made use of as communication sections for another type of communication. Thus, interference between Bluetooth® communication and another type of communication can readily be avoided and data can efficiently be communicated.

In the present example, in performing re-adjustment processing, a local terminal in the sniff mode is set to the active mode and set again to the sniff mode. The re-adjustment processing, however, may be performed while the sniff mode is continued without transition to the active mode.

Second Modification of Third Embodiment

In the first modification, when the main body side determines in step S52 in FIG. 18 that communication cannot be established in the empty section (NO in step S52), it performs re-adjustment processing. Alternatively, when the main body side determines in step S50 that there is an empty section (YES in step S50), it may perform re-adjustment processing (step S56).

The re-adjustment processing is the same as in the first modification.

Figure 21:
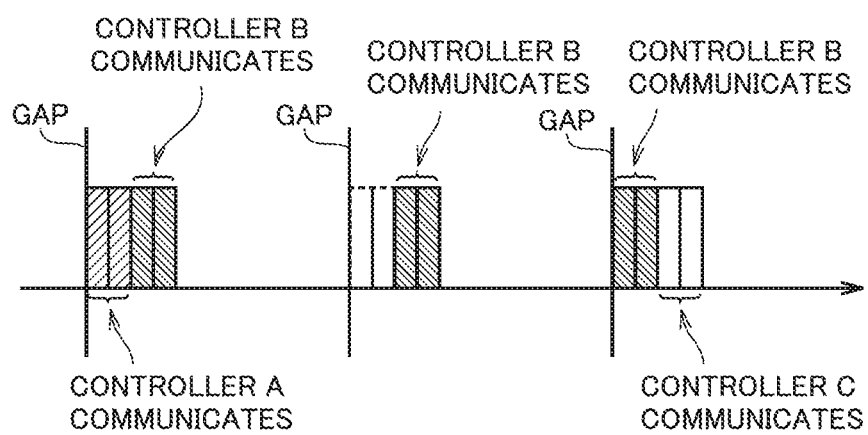
FIG. 21 is a diagram illustrating adjustment of timing in Bluetooth® communication in the sniff mode based on a second modification of the third embodiment.

FIG. 21 is a diagram illustrating adjustment of timing in Bluetooth® communication in the sniff mode based on a second modification of the third embodiment.

As shown in FIG. 21, Bluetooth® communication in the sniff mode in controllers A and B as two local terminals is established in the present example. Controller A quits communication.

Thus, there is an empty section between group anchor point GAP and controller B.

Since there is an empty section when controller C participates in communication as a new local terminal, re-adjustment processing is performed in the present example.

Thus, communication sections which are communication sections for controllers B and C are continuously set with group anchor point GAP being defined as the reference timing.

Re-adjustment processing is performed when there is an empty section among all communication sections in Bluetooth® communication in the sniff mode so that waste of an empty section is suppressed and communication processing can be continued without discontinuity.

By setting communication sections in one group, remaining communication sections can be made use of as communication sections for another type of communication. Thus, interference between Bluetooth® communication and another type of communication can readily be avoided and data can efficiently be communicated.

Third Modification of Third Embodiment

In the third embodiment, in performing re-adjustment processing, a relevant local terminal is once set to the active mode from the sniff mode and setting of timing (setting again of a communication section) is made. A communication section may be set again while Bluetooth® communication in the sniff mode is maintained.

Specifically, timing information in Bluetooth® communication in the sniff mode may be changed in relation with each local terminal corresponding to a communication section set subsequent to an empty section.

For example, in the example in FIG. 21, in setting the sniff mode between the main body side and controller B, a command to change (advance) timing of communication sections corresponding to two slots can also be transmitted to controller B to thereby change timing information.

Alternatively, in the example in FIG. 21, setting of group anchor point GAP defined as the reference timing can also be changed to thereby change (retard) timing of communication sections including two slots and to change timing information.

Fourth Embodiment

Though an identifier TSI is fixed in embodiments above, an identifier TSI can also be changed.

Specifically, when the number of local terminals which communicate increases, an identifier TSI may be changed.

[c9. Main Communication Processing in Information Processing Apparatus Main Body 5]

Figure 22:
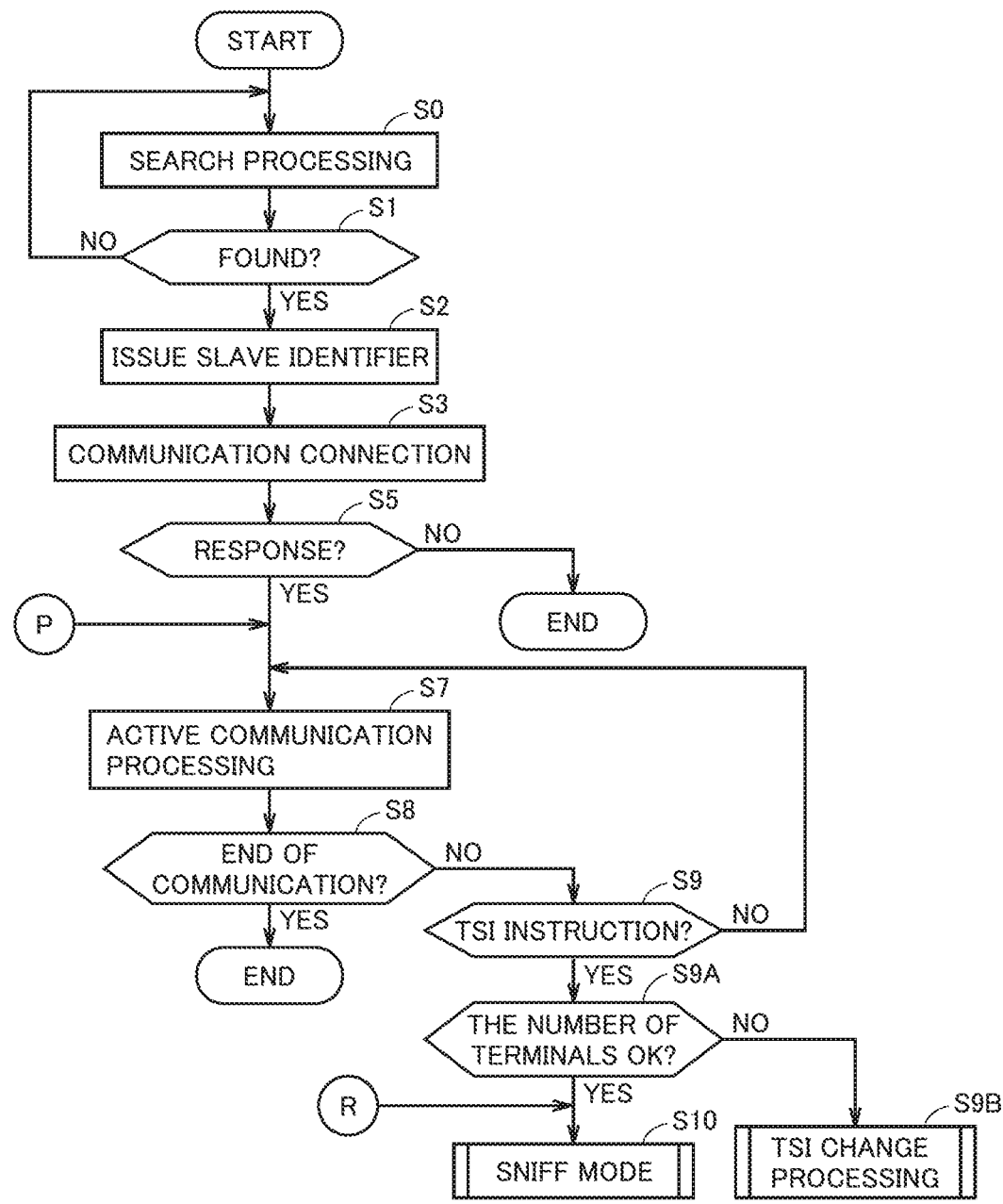
FIG. 22 is a flowchart illustrating main communication processing in information processing apparatus main body 5 (main body side) based on a fourth embodiment.

FIG. 22 is a flowchart illustrating main communication processing in information processing apparatus main body 5 (main body side) based on a fourth embodiment.

FIG. 22 is different from the flowchart in FIG. 8 in addition of steps S9A and S9B. Since a configuration is otherwise the same as described with reference to FIG. 8, detailed description thereof will not be repeated.

When the main body side determines in step S9 that it receives an instruction of an identifier TSI (YES in step S9), it determines whether or not the number of terminals which can communicate is OK (step S9A). Specifically, terminal number management unit 108 determines whether or not the number of terminals which communicate is equal to or smaller than the number of connectable terminals in connection with an indicated identifier TSI in making transition to the sniff mode.

When it is determined in step S9A that the number of terminals is OK (YES in step S9A), processing for making transition to the sniff mode is performed (step S10).

When it is determined in step S9A that the number of terminals is not OK (NO in step S9A), TSI change processing is performed (step S9B). Number management unit 108 determines that the number of terminals is not OK when the number of terminals which communicate has already reached the upper limit value for the number of connectable terminals in making transition to the sniff mode. Number management unit 108 notifies mode setting unit 112 of that fact. TSI change processing will be described later.

[c10. TSI Change Processing in Information Processing Apparatus Main Body 5]

Figure 23:
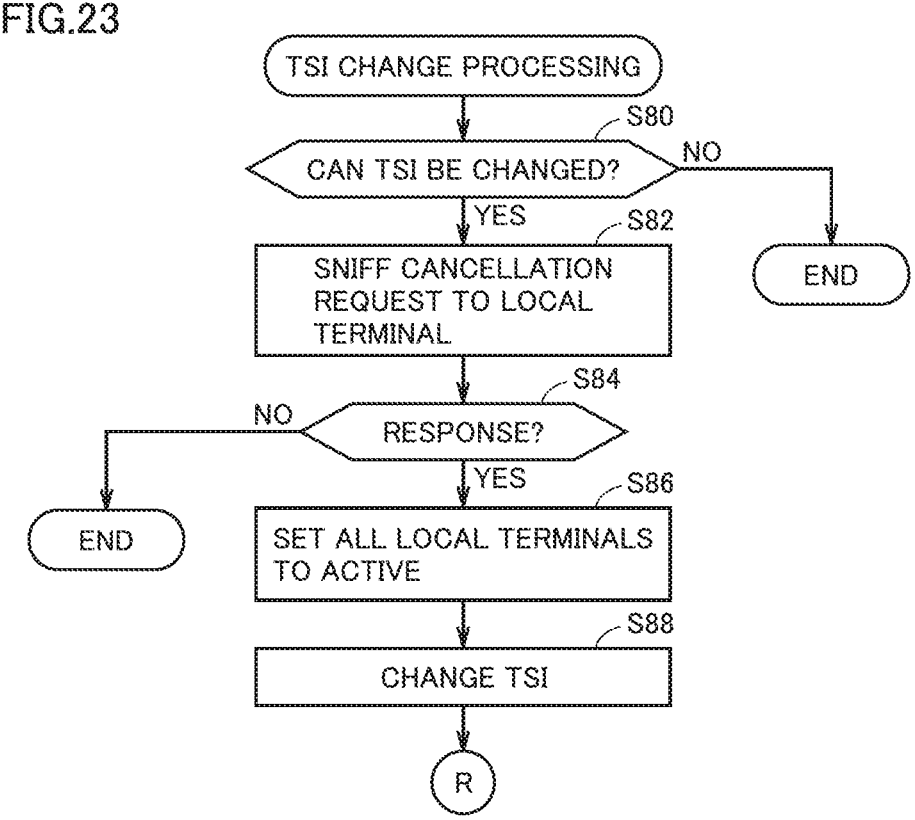
FIG. 23 is a flowchart illustrating TSI change processing in information processing apparatus main body 5 based on the fourth embodiment.

FIG. 23 is a flowchart illustrating TSI change processing in information processing apparatus main body 5 based on the fourth embodiment.

Referring to FIG. 23, the main body side determines whether or not a TSI can be changed (step S80). Mode setting unit 112 determines whether or not change from a current identifier TSI can be made in changing the number of connectable terminals. Specifically, whether or not the number of connectable terminals can be changed is determined while the number of slots is maintained. For example, change from current identifier TSI0 (the number of uplinks being 3 and the number of downlinks being 3) to identifier TSI5 (the number of uplinks being 3 and the number of downlinks being 3) can be made. Similarly, change from identifier TSI1 (the number of uplinks being 1 and the number of downlinks being 1) to identifier TSI9 (the number of uplinks being 1 and the number of downlinks being 1) can be made. When the number of slots cannot be maintained, it is determined that change cannot be made.

When the main body side determines in step S80 that change in TSI can be made (YES in step S80), it issues a sniff cancellation request to all local terminals (step S82). Mode setting unit 112 transmits a sniff cancellation request to all local terminals.

The main body side determines whether or not it receives a response from each local terminal (step S84). Mode setting unit 112 determines whether or not it has received a response from each local terminal.

When the main body side determines in step S84 that it receives a response from each local terminal (YES in step S84), it sets all local terminals to the active mode (step S86). Mode setting unit 112 sets all local terminals which have responded to the active mode.

The main body side changes a TSI (step S88). Mode setting unit 112 changes an identifier TSI. Specifically, when the current identifier is TSI0, change to identifier TSI5 is made. When the current identifier is TSI1, change to identifier TSI9 is made.

The process proceeds to "R".

In "R", processing for making transition to the sniff mode in step S10 in FIG. 8 is performed.

In accordance with a procedure the same as described with reference to FIG. 9, the main body side makes communication setting in accordance with an identifier TSI (step S12). Specifically, mode setting unit 112 makes communication setting based on the communication setting information in accordance with an identifier TSI. For example, when mode setting unit 112 changes from identifier TSI0 to identifier TSI5, it makes communication setting such that the number of connectable local terminals (the number of connectable terminals) is set to "4", for setting the number slots, the number of uplinks for data from the local terminal to the main body side is set to "3" and the number of downlinks for data from the main body side to the local terminal is set to "3", and a sniff interval representing a periodic communication interval is set to "15" (ms). Mode setting unit 112 gives information on the number of connectable local terminals (the number of connectable terminals) to terminal number management unit 108. Number management unit 108 manages the number of connectable terminals upon receiving the information.

Then, in setting of timing in step S13, a communication section for each local terminal is set again.

An updated sniff request is transmitted from the main body side to each local terminal.

The main body side determines whether or not it receives a response from each local terminal. When the main body side determines that it receives a response, it sets the local terminal to the sniff mode. Mode setting unit 112 sets the sniff mode in relation with each local terminal which has responded and performs synchronous communication processing in the sniff mode in accordance with an updated identifier TSI.

When the number of connected terminals can be changed in Bluetooth® communication in the sniff mode, an identifier TSI is changed and re-adjustment is made so that data can efficiently be communicated.

Modification of Fourth Embodiment

An identifier TSI is changed by changing the number of terminals in embodiments above. An amount of communicated data may change depending on a condition of an application. For example, in some cases, the number of downlinks for data from the main body side to a local terminal should be increased. By way of example, when data for activating vibrator 719 in controller 7 is transmitted from the main body side to controller 7, the number of downlinks may be small. When audio data is output from speaker 707 in controller 7, however, the number of downlinks should be increased.

In contrast, the number of uplinks also for data from a local terminal to the main body side should be increased in some cases. By way of example, when operation data of controller 7 is transmitted from controller 7 to the main body side, the number of uplinks may be small. When audio data input to microphone 709 in controller 7 is transmitted, however, the number of slots of uplinks should be increased.

[c11. Change in TSI in Information Processing Apparatus Main Body 5]

Figure 24:
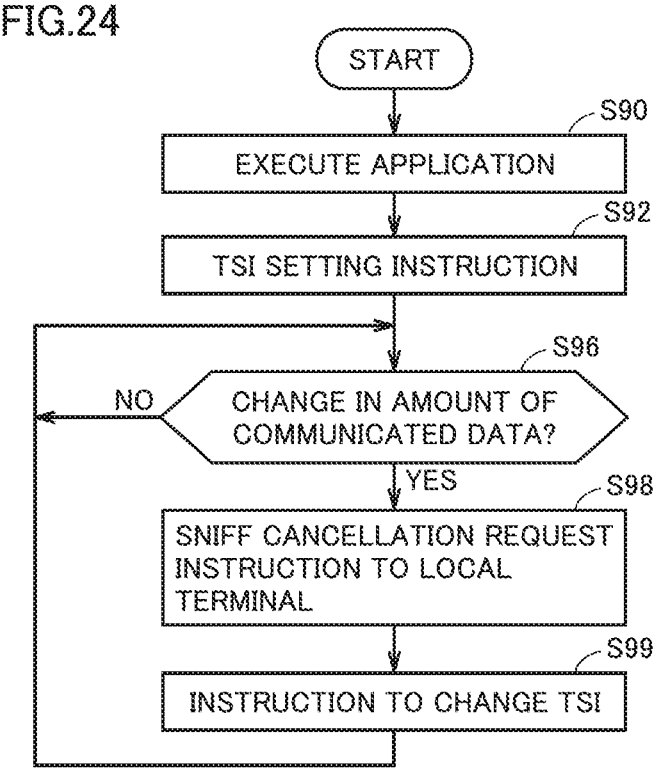
FIG. 24 is a flowchart illustrating setting for changing a TSI in information processing apparatus main body 5 based on a modification of the fourth embodiment.

FIG. 24 is a flowchart illustrating setting for changing a TSI in information processing apparatus main body 5 based on a modification of the fourth embodiment.

Referring to FIG. 24, the main body side executes an application (step S90). Application execution unit 200 performs prescribed application processing based on a prescribed application program.

The main body side sets a TSI (step S92). Application execution unit 200 designates an identifier TSI and notifies mode setting unit 112 of the identifier TSI. By way of example, in the initial state, a prescribed identifier TSI is designated in accordance with the application program.

The main body side determines whether or not an amount of communicated data is changed (step S96). Application execution unit 200 determines whether or not an amount of communicated data is changed in accordance with prescribed application processing. For example, whether or not the number of downlinks should be increased or the number of uplinks should be increased in accordance with application processing is determined.

When the main body side determines in step S96 that an amount of communicated data is changed (YES in step S96), it instructs all local terminals to transmit a sniff cancellation request (step S98). When application execution unit 200 determines that an amount of communicated data is changed in accordance with the prescribed application processing, it instructs mode setting unit 112 to transmit a sniff cancellation request. Mode setting unit 112 transmits a sniff cancellation request to all local terminals in response to the instruction from application execution unit 200. Accordingly, all local terminals are set to the active mode.

The main body side changes a TSI (step S99). Application execution unit 200 gives an instruction to change an identifier TSI. Specifically, application execution unit 200 gives an instruction to change to an identifier TSI different in number of slots based on the amount of communicated data. For example, application execution unit 200 instructs mode setting unit 112 to change from identifier TSI1 to identifier TSI2 or identifier TSI3 when the number of downlinks is to be increased. Application execution unit 200 instructs mode setting unit 112 to change from identifier TSI1 to identifier TSI4 or identifier TSI6 when the number of uplinks is to be increased. Mode setting unit 112 performs processing for making transition to the sniff mode on all local terminals in accordance with a changed identifier TSI as instructed by application execution unit 200. Specifically, the flow described with reference to FIG. 9 is performed.

Specifically, in accordance with a procedure the same as described with reference to FIG. 9, the main body side makes communication setting in accordance with an identifier TSI (step S12). Mode setting unit 112 makes communication setting based on the communication setting information in accordance with an identifier TSI. For example, when mode setting unit 112 changes setting from identifier TSI1 to identifier TSI2, it makes communication setting such that the number of connectable local terminals (the number of connectable terminals) is "4", for setting the number of slots, the number of uplinks for data from a local terminal to the main body side is "1" and the number of downlinks for data from the main body side to the local terminal is "3", and a sniff interval representing a periodic communication interval is "10" (ms). Mode setting unit 112 gives information on the number of connectable local terminals (the number of connectable terminals) to terminal number management unit 108. Number management unit 108 manages the number of connectable terminals upon receiving the information.

Then, in setting of timing in step S13, a communication section for each local terminal is set again.

An updated sniff request is transmitted from the main body side to each local terminal.

The main body side determines whether or not it receives a response from each local terminal. When the main body side determines that it receives a response, it sets the local terminal to the sniff mode. Mode setting unit 112 sets the sniff mode in relation with each local terminal which has responded and performs synchronous communication processing in the sniff mode in accordance with an updated identifier TSI.

Through the processing, synchronous communication processing in the sniff mode between the main body side and each local terminal based on a changed identifier TSI is performed.

Therefore, when an amount of communicated data is changed depending on a condition of an application, an identifier TSI for increasing the number of slots in accordance with an amount of communicated data can be set. By changing to an optimal identifier TSI, data can efficiently be communicated.

Though the number of slots is increased in the present example, the present example is also applicable to decrease in number of slots due to change in amount of communicated data.

Fifth Embodiment

A fifth embodiment describes communication processing in a burst mode representing another type of communication mode different from the sniff mode.

Figure 25:
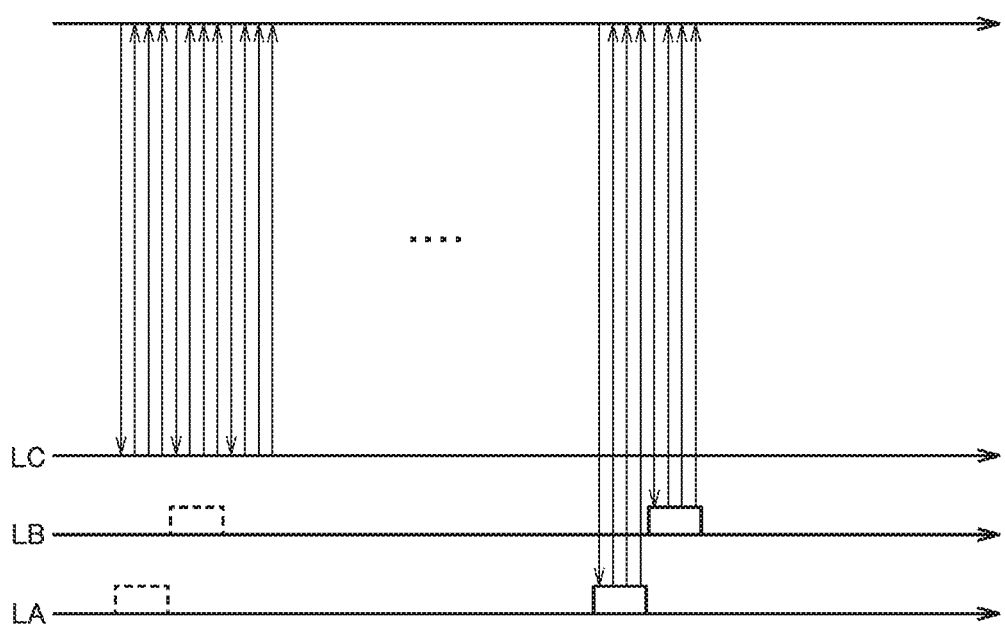
FIG. 25 is a conceptual diagram illustrating communication processing in a burst mode based on a fifth embodiment.

FIG. 25 is a conceptual diagram illustrating communication processing in a burst mode based on the fifth embodiment.

As shown in FIG. 25, by way of example, the main body side and local terminals LA to LC perform communication processing.

In the present example, communication processing in the burst mode is set in local terminal LC. Communication processing in the sniff mode is set in local terminals LA and LB.

When the burst mode is set in local terminal LC, communication processing is performed with local terminal LC being prioritized also in a section in which local terminals LA and LB and the main body side perform communication processing in the sniff mode.

Therefore, when the burst mode is set in local terminal LC, local terminals LA and LB continue communication processing in the sniff mode without recognizing the fact that local terminal LC preferentially performs processing for communication with the main body side.

Since communication processing between the main body side and local terminal LC is prioritized, the number of times of data communication can be increased. Thus, data can preferentially be transmitted and received between local terminal LC and the main body side. For example, when a camera of local terminal LC is used to transmit image data large in amount of data to the main body side, local terminal LC is set to the burst mode so that the main body side can obtain image data containing much data from local terminal LC in an early stage.

The main body side performs processing for communicating with local terminals LA and LB every prescribed period. Communication processing in the sniff mode between the main body and local terminals LA and LB can also be continued.

When the burst mode is set, communication through WI-FI communication is restricted. Thus, an information processing apparatus in which first wireless communication and second wireless communication do not interfere with each other, collision of data is avoided, and communication quality is satisfactory can be realized.

[c12. Processing for Executing Application in Information Processing Apparatus Main Body 5]

Figure 26:
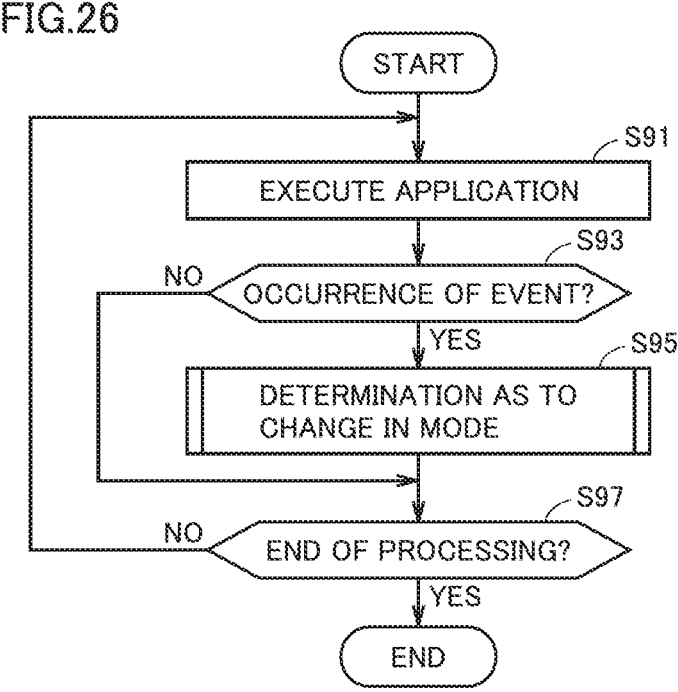
FIG. 26 is a flowchart illustrating processing for executing an application in information processing apparatus main body 5 based on the fifth embodiment.

FIG. 26 is a flowchart illustrating processing for executing an application in information processing apparatus main body 5 based on the fifth embodiment.

As shown in FIG. 26, the main body side executes an application (step S91). Application execution unit 200 performs prescribed application processing based on a prescribed application program.

Then, the main body side determines whether or not an event for making transition to the burst mode has occurred (step S93). Application execution unit 200 determines whether or not an event for making transition to the burst mode has occurred. Specifically, in the present example, whether or not an event in which a microphone or a camera in a local terminal is used has occurred is determined.

When the main body side determines in step S93 that an event for making transition to the burst mode has occurred (YES in step S93), it makes determination as to change in mode (step S95). When application execution unit 200 determines that an event for making transition to the burst mode has occurred, it makes determination as to change in mode. Details of processing for determination as to change in mode will be described later.

The main body side determines whether or not the process has ended (step S97).

When the main body side determines in step S97 that the process has ended, the process ends (end).

When the main body side determines in step S97 that the process does not end (NO in step S97), the process returns to step S91 in which the main body side continues prescribed application processing.

[c13. Determination as to Change in Mode in Information Processing Apparatus Main Body 5]

Figure 27:
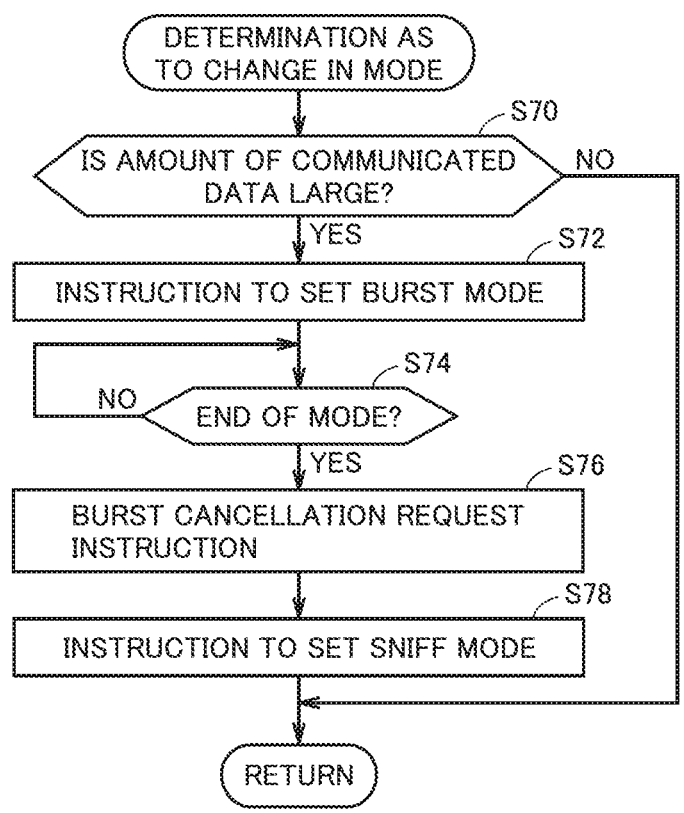
FIG. 27 is a flowchart illustrating determination as to change in mode in information processing apparatus main body 5 based on the fifth embodiment.

FIG. 27 is a flowchart illustrating determination as to change in mode in information processing apparatus main body 5 based on the fifth embodiment.

As shown in FIG. 27, whether or not an amount of communicated data is large is determined (step S70). Application execution unit 200 makes determination as to whether or not an amount of communicated data is large.

When it is determined in step S70 that an amount of communicated data is large (YES in step S70), setting of the burst mode is indicated (step S72). For example, when an event in which a microphone or a camera in a designated local terminal is used has occurred, it is determined that an amount of communicated data is large. Application execution unit 200 instructs mode setting unit 112 to set the burst mode. Mode setting unit 112 designates a local terminal in response to the instruction from application execution unit 200 and transmits a burst instruction.

The main body side determines whether or not it has quitted processing for the burst mode (step S74). Application execution unit 200 determines whether or not it has quitted processing for the burst mode. For example, when an event in which a microphone or a camera in a designated local terminal is used has ended, it is determined that the processing for the burst mode has ended.

When it is determined in step S74 that the processing for the burst mode has ended (YES in step S74), a burst cancellation request instruction is issued (step S76). Application execution unit 200 instructs mode setting unit 112 to transmit a burst mode cancellation request. Mode setting unit 112 designates a local terminal in response to the instruction from application execution unit 200 and transmits the burst cancellation request.

The main body side indicates setting of the sniff mode (step S78). Application execution unit 200 instructs mode setting unit 112 to set the sniff mode. Application execution unit 200 gives an instruction of an identifier TSI to mode setting unit 112.

Then, the process ends (return).

When it is determined in step S70 that an amount of communicated data is not large (NO in step S70), the processing is skipped and the process ends (return).

[c14. Main Communication Processing in Information Processing Apparatus Main Body 5]

Figure 28:
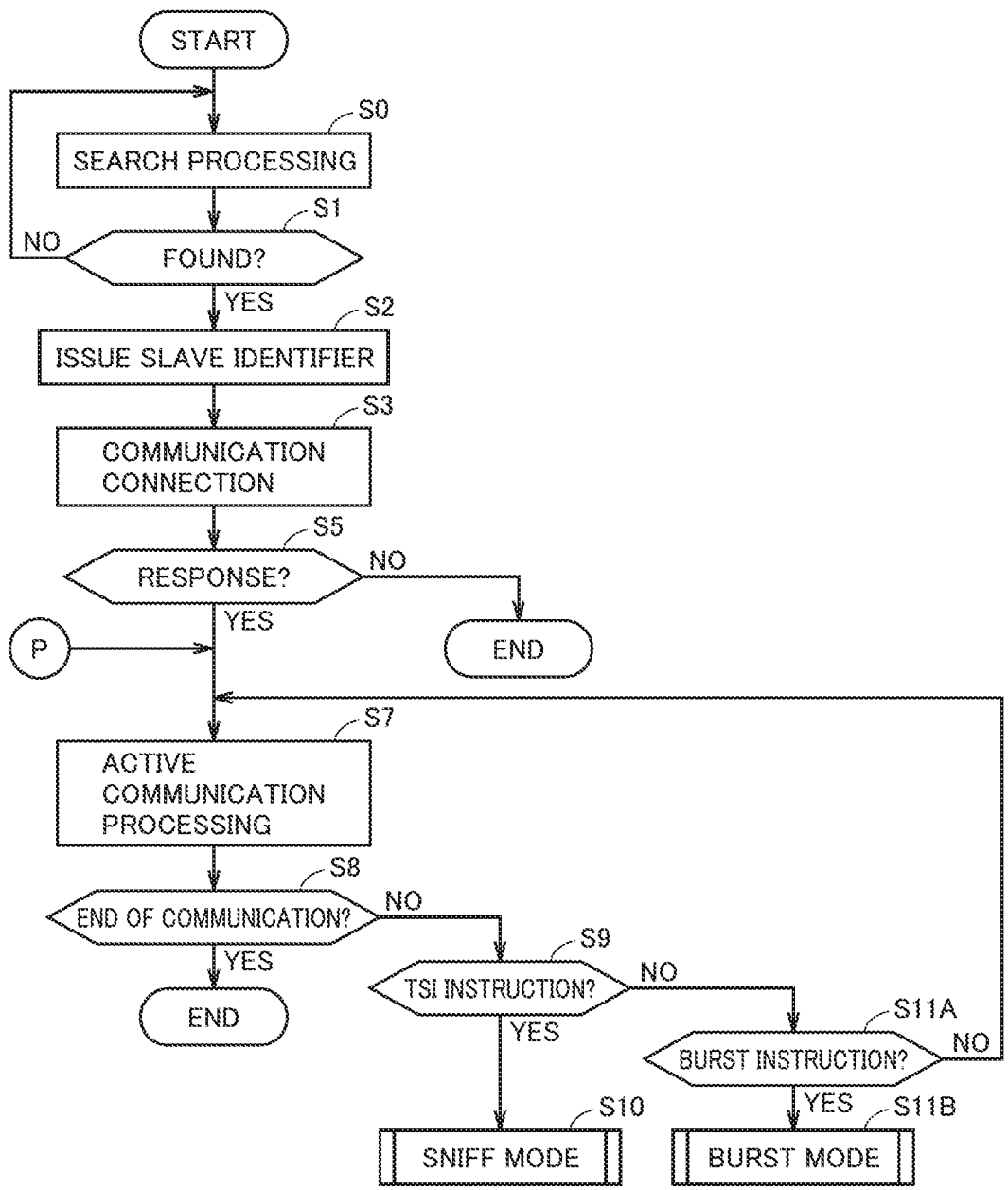
FIG. 28 is a flowchart illustrating main communication processing in information processing apparatus main body 5 (main body side) based on the fifth embodiment.

FIG. 28 is a flowchart illustrating main communication processing in information processing apparatus main body 5 (main body side) based on the fifth embodiment.

FIG. 28 is different from the flowchart in FIG. 9 in addition of steps S11A and S11B. Since the processing is otherwise the same as described above, detailed description thereof will not be repeated.

When the main body side determines in step S9 that an instruction of an identifier TSI has not been given (NO in step S9), it determines whether or not a burst instruction has been given (step S11A). Mode setting unit 112 determines whether or not an instruction to set a designated local terminal to the burst mode has been given by application execution unit 200.

When the main body side determines in step S11A that a burst instruction has been given (YES in step S11A), it performs processing for making transition to the burst mode (step S11B). Details of processing for making transition to the burst mode will be described later.

When the main body side determines in step S11A that a burst instruction has not been given (NO in step S11A), the process returns to step S7 in which communication processing in the active mode is continued.

[c15. Processing for Making Transition to Burst Mode in Information Processing Apparatus Main Body 5]

Figure 29:
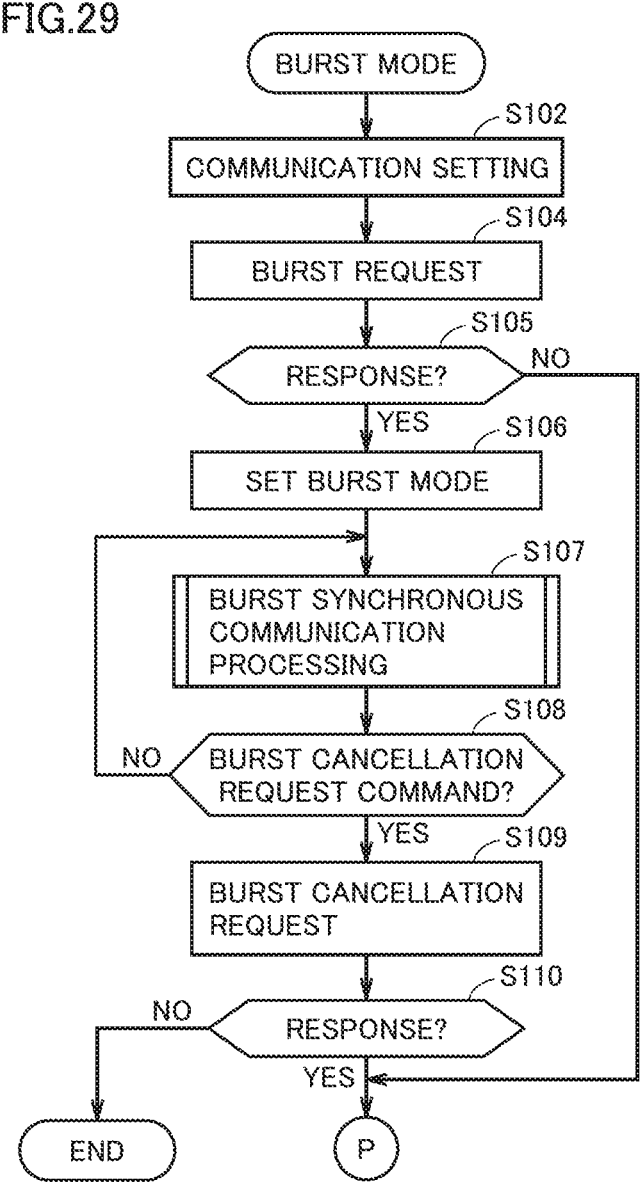
FIG. 29 is a flowchart illustrating processing for making transition to the burst mode in information processing apparatus main body 5 based on the fifth embodiment.

FIG. 29 is a flowchart illustrating processing for making transition to the burst mode in information processing apparatus main body 5 based on the fifth embodiment.

As shown in FIG. 29, the main body side makes setting for synchronous communication in the burst mode (step S102). Specifically, mode setting unit 112 makes communication setting in the burst mode. Specifically, the number of slots used for communication defined in advance in the burst mode is set.

The main body side transmits a burst request to a local terminal (step S104). Mode setting unit 112 transmits a burst request including the number of links set in communication setting to a designated local terminal. In the present example, mode setting unit 112 transmits a burst request not to all local terminals but to only a designated local terminal by way of example.

Information on a designated local terminal to which a burst request has been transmitted may be transmitted to all local terminals.

The main body side determines whether or not it receives a response from a local terminal (step S105). Mode setting unit 112 determines whether or not it has received a response from a local terminal.

When the main body side determines in step S105 that it receives a response from a local terminal (YES in step S105), it sets the burst mode (step S106).

Mode setting unit 112 sets the burst mode in relation with a local terminal which has responded. In the present example, in communication with a plurality of local terminals, a communication mode can be set in relation with each local terminal. Therefore, the main body side can be in synchronous communication in the sniff mode with a certain local terminal and in communication in the burst mode with another local terminal.

Communication processing in the burst mode between the main body side and a local terminal is performed (step S107). The communication processing in the burst mode is processing for prioritized communication with a certain designated local terminal. Communication processing in the burst mode will be described later.

The main body side determines whether or not a burst cancellation request command has been given (step S108). Mode setting unit 112 determines whether or not it has received an active request command designating the active mode from application execution unit 200.

When the main body side determines in step S108 that it receives a burst cancellation request command (YES in step S108), it transmits a burst cancellation request to a local terminal (step S109). Mode setting unit 112 transmits a burst cancellation request to a designated local terminal.

The main body side determines whether or not it receives a response from a local terminal (step S110). Mode setting unit 112 determines whether or not it receives a response from a local terminal.

When the main body side determines in step S110 that it receives a response from a local terminal (YES in step S110), the process proceeds to "P", that is, returns to step S7 in FIG. 28. When mode setting unit 112 determines that it receives a response from a local terminal, it sets the active mode.

When the main body side determines in step S110 that it does not receive a response from a local terminal (NO in step S110), the process ends (end).

When the main body side determines in step S108 that it does not receive a burst cancellation request command (NO in step S108), the process returns to step S107 and communication processing in the burst mode is continued.

When the main body side determines in step S105 that it does not receive a response from a local terminal (NO in step S105), the process proceeds to "P" without entering the burst mode, that is, returns to step S7 in FIG. 28. Mode setting unit 112 quits processing for making transition to the burst mode.

[c16. Communication Processing in Burst Mode in Information Processing Apparatus Main Body 5]

Figure 30:
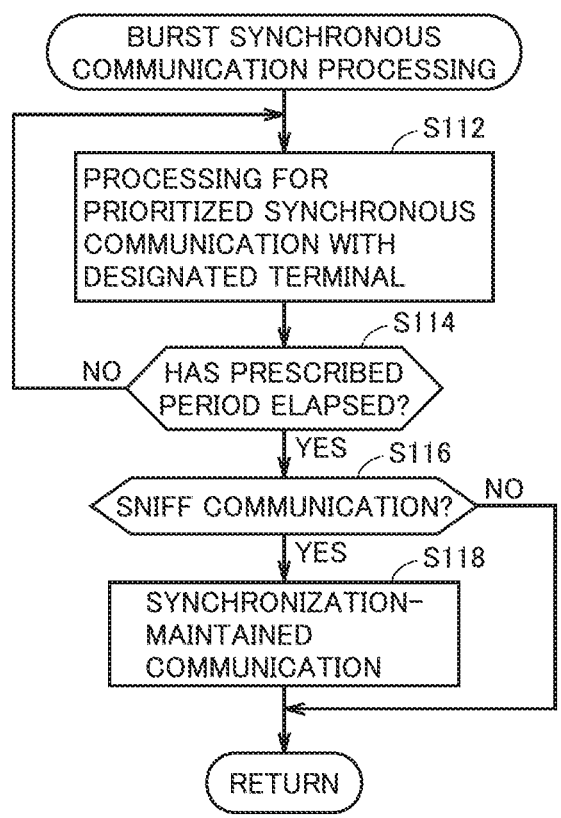
FIG. 30 is a flowchart illustrating communication processing in the burst mode based on the fifth embodiment.

FIG. 30 is a flowchart illustrating communication processing in the burst mode based on the fifth embodiment.

Referring to FIG. 30, processing for prioritized communication with a designated terminal is performed (step S112). Upon receiving a polling packet from the main body side, a local terminal performs communication processing for preferentially transmitting a packet with a prescribed number of links.

The main body side determines whether or not a prescribed period has elapsed (step S114). Mode setting unit 112 determines whether or not a prescribed period has elapsed. The prescribed period is shorter than a limit period (supervision timeout) during which communication connection is maintained.

When the main body side determines that the prescribed period has not elapsed (NO in step S114), the process returns to step S112 in which prioritized communication processing is continued.

When it is determined in step S114 that the prescribed period has elapsed (YES in step S114), whether or not sniff communication has been established is determined (step S116). Mode setting unit 112 determines whether or not processing for synchronous communication with another local terminal in the sniff mode is performed.

When it is determined in step S116 that sniff communication has been established (YES in step S116), synchronization-maintained communication is established (step S118). Specifically, when mode setting unit 112 determines that processing for synchronous communication with another local terminal in the sniff mode is performed, it establishes communication for maintaining synchronous communication in the sniff mode. Specifically, in order to maintain processing for synchronous communication with another local terminal in the sniff mode, the main body side transmits a polling packet each time a prescribed period elapses. Thus, even during a period in which communication with a specific local terminal is intensively performed in the burst mode, communication connection with other local terminals is maintained.

Then, the process ends (return).

[c17. Main Communication Processing in Local Terminal]

Main communication processing in a local terminal is described. The local terminal includes controller 7.

Figure 31:
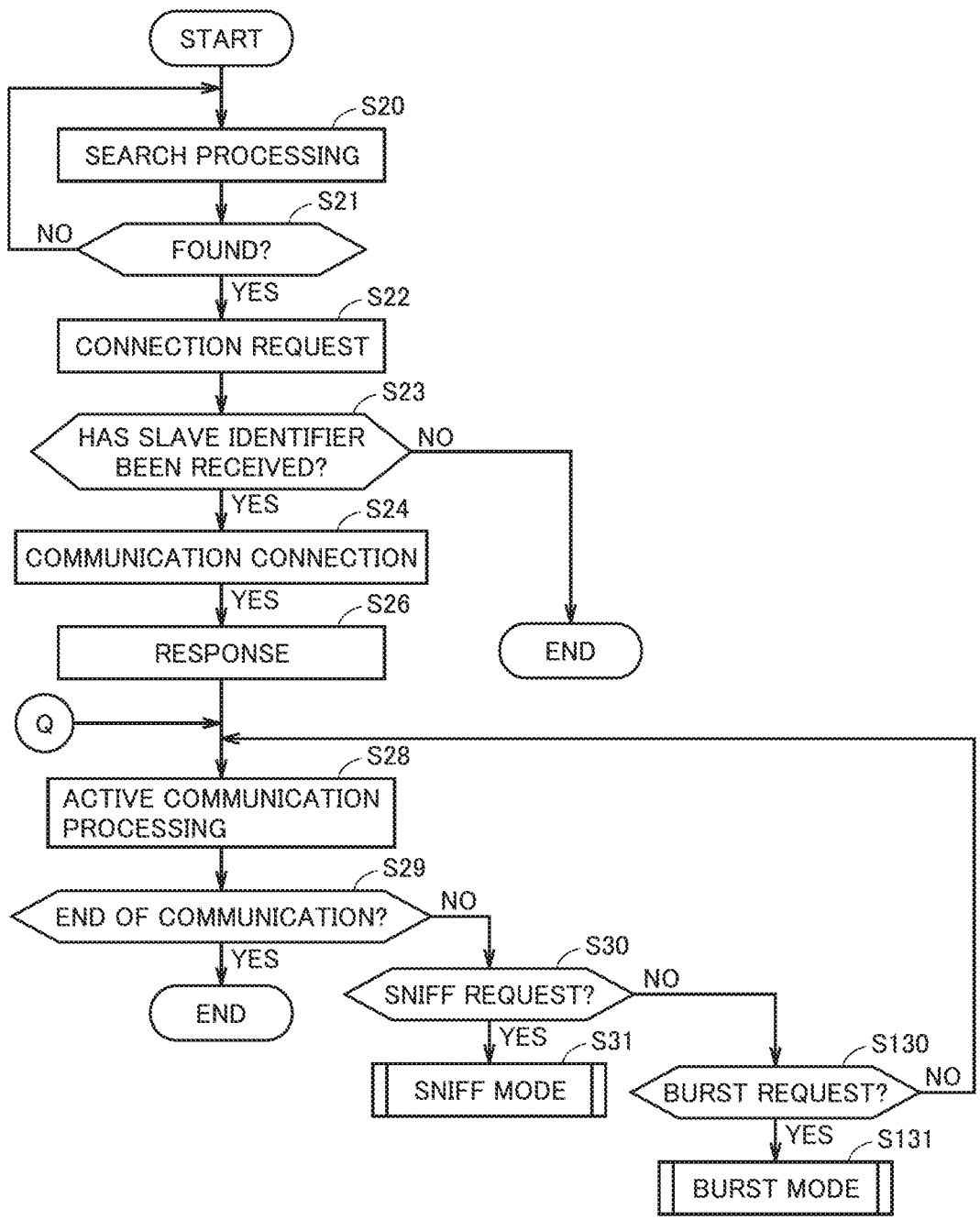
FIG. 31 is a flowchart illustrating main communication processing in a local terminal based on the fifth embodiment.

FIG. 31 is a flowchart illustrating main communication processing in a local terminal based on the fifth embodiment.

FIG. 31 is different from the flowchart in FIG. 12 in addition of steps S130 and S131. Since the processing is otherwise the same as in FIG. 12, detailed description thereof will not be repeated.

When a local terminal determines in step S30 that a sniff request has not been given (NO in step S30), it determines whether or not a burst request has been given (step S130).

When the local terminal determines in step S130 that a burst request has been given (YES in step S130), it performs processing for making transition to the burst mode. Processing for making transition to the burst mode will be described later.

When the local terminal determines in step S130 that a burst request has not been given (NO in step S130), the process returns to step S28 in which the local terminal continues communication processing in the active mode. When the local terminal does not receive data of the burst request, it continues communication processing in the active mode as the communication mode.

[c18. Processing for Making Transition to Burst Mode in Local Terminal]

Figure 32:
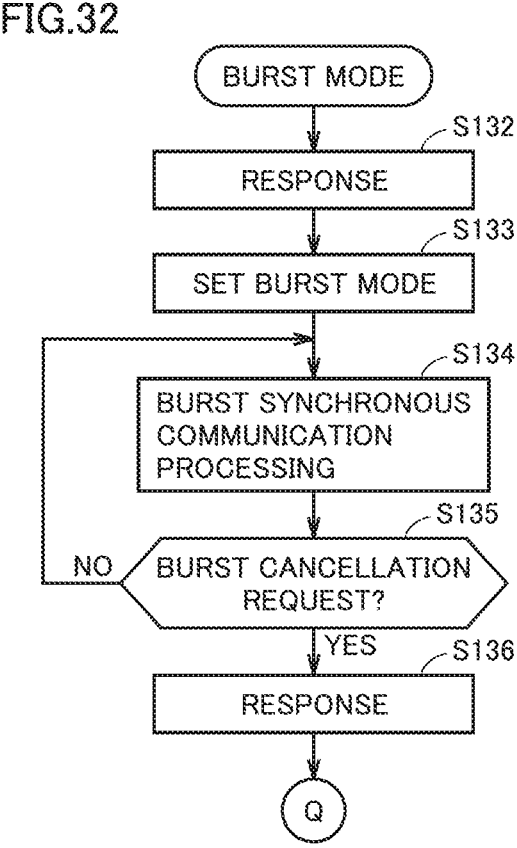
FIG. 32 is a flowchart illustrating processing for making transition to the burst mode in the local terminal based on the fifth embodiment.

FIG. 32 is a flowchart illustrating processing for making transition to the burst mode in a local terminal based on the fifth embodiment.

As shown in FIG. 32, a local terminal responds when it receives a burst request (step S132). When the local terminal determines that it has received a burst request from the main body side, it transmits a response signal to the main body side.

The local terminal sets the burst mode (step S133). The local terminal sets the communication mode to the burst mode in accordance with the burst request.

The local terminal sets the number of defined slots included in the burst request.

The local terminal performs communication processing in the burst mode (step S134).

The local terminal preferentially receives a polling packet from the main body side and transmits a packet including the defined number of slots.

The local terminal determines whether or not it receives a burst cancellation request (step S135). Specifically, the local terminal determines whether or not it has received a burst cancellation request for cancelling the burst mode transmitted from the main body side.

When the local terminal determines in step S135 that it receives a burst cancellation request (YES in step S135), it responds (step S136). When the local terminal determines that it has received a burst cancellation request from the main body side, it transmits a response signal to the main body side.

Then, the process proceeds to "Q", that is, returns to step S28 in FIG. 31, in which communication processing in the active mode is performed. Subsequent processing is the same as described above.

When the local terminal determines in step S135 that it does not receive a burst cancellation request (NO in step S135), the process returns to step S134 in which the local terminal continues communication processing in the burst mode.

Modification of Fifth Embodiment

In the fifth embodiment, for communication in which synchronous communication in the sniff mode is maintained, the main body side transmits a polling packet each time a prescribed period elapses. Any scheme may be adopted so long as synchronous communication in the sniff mode can be maintained.

For example, a data packet indicating that the burst mode is being executed may be transmitted to a local terminal which performs synchronous communication processing in the sniff mode to thereby maintain synchronous communication in the sniff mode. A data packet indicating that synchronous communication processing in the sniff mode is performed may be transmitted after lapse of a prescribed period of time to maintain synchronous communication in the sniff mode.

An application executable by a personal computer may be provided as a program in the present embodiment. The program according to the present embodiment may be incorporated as some functions (modules) of various applications executed on the personal computer.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims.

What is claimed is:

1. An information processing apparatus comprising:
a first transceiver configured to establish synchronous communication with each of a first apparatus and a second apparatus in a Bluetooth sniff mode, wherein the first transceiver is further configured to establish synchronous communication with each of a fourth apparatus and a fifth apparatus in the Bluetooth sniff mode,
a second transceiver configured to communicate with a third apparatus under a second wireless communication standard different from the Bluetooth standard, and
a control circuit configured to perform timing adjustment processing for adjusting, for providing a period of communication by the second transceiver, a timing of synchronous communication with the first apparatus, a timing of synchronous communication with the second apparatus, and a timing of synchronous communication with the fourth apparatus, such that a time point of end of synchronous communication with the first apparatus by the first transceiver is substantially continuous to a time point of start of synchronous communication with the second apparatus by the first transceiver, and a time point of end of synchronous communication with the second apparatus by the first transceiver is substantially continuous to a time point of start of synchronous communication with the fourth apparatus by the first transceiver, wherein the control circuit is further configured to:
compare a number of slots of synchronous communication of the second apparatus and a number of slots of synchronous communication of the fifth apparatus with each other; and
adjust timing of synchronous communication with the fifth apparatus based on a result of the comparison when the second apparatus quits communication such that (a) a time point of end of synchronous communication for the first apparatus is substantially continuous to a time point of start of synchronous communication for the fifth apparatus, provided that the number of slots of synchronous communication of the second apparatus is the same as or larger than the number of slots of synchronous communication of the fifth apparatus; and (b) a time point of end of synchronous communication for the fourth apparatus is substantially continuous to a time point of start of synchronous communication for the fifth apparatus, provided that the number of slots of synchronous communication of the second apparatus is smaller than the number of slots of synchronous communication of the fifth apparatus.

2. The information processing apparatus according to claim 1, wherein intervals of synchronous communication with the first apparatus and the second apparatus by the first transceiver are substantially identical.

3. The information processing apparatus according to claim 1, wherein the control circuit is further configured to perform reference timing setting processing for setting reference timing serving as a reference of timing of synchronous communication with each of the first apparatus and the second apparatus by the first transceiver.

4. The information processing apparatus according to claim 3, wherein the control circuit is further configured to, as the timing adjustment processing, adjust timing of synchronous communication with each of the first apparatus and the second apparatus by the first transceiver in accordance with the reference timing set in the reference timing setting processing.

5. The information processing apparatus according to claim 3, wherein the control circuit is further configured to, as the timing adjustment processing, adjust timing of any one or more of synchronous communication with the second apparatus and timing of synchronous communication with the fourth apparatus such that a time point of end of synchronous communication for the second apparatus is substantially continuous to a time point of start of synchronous communication for the fourth apparatus in accordance with the reference timing when synchronous communication with the fourth apparatus is established after synchronous communication with the first apparatus ended.

6. The information processing apparatus according to claim 4, wherein
the control circuit is further configured to, as timing adjustment processing, adjust timing of synchronous communication with each of the first apparatus, the second apparatus, and the fourth apparatus by the first transceiver in accordance with the reference timing set in the reference timing setting processing.

7. The information processing apparatus according to claim 4, wherein the control circuit is further configured to, as the timing adjustment processing, adjust timing of any one or more of synchronous communication with the first apparatus, the second apparatus, and the fourth apparatus and timing of synchronous communication with the fifth apparatus in accordance with the reference timing such that the continuing synchronous communication is substantially continuous to synchronous communication with the fifth apparatus when synchronous communication with at least one of the first apparatus, the second apparatus, and the fourth apparatus ended.

8. The information processing apparatus according to claim 1, wherein intervals of synchronous communication with the first apparatus, second apparatus, and fourth apparatus, by the first transceiver are substantially identical.

9. A method of controlling an information processing apparatus the method comprising:
   establishing synchronous communication with each of a first apparatus and a second apparatus in a Bluetooth sniff mode;
   establishing synchronous communication with each of a fourth apparatus and a fifth apparatus in the Bluetooth sniff mode;
   communicating with a third apparatus under a wireless communication standard different from the Bluetooth standard;
   adjusting, for providing a period of communication with the third apparatus, a timing of synchronous communication with the first apparatus, a timing of synchronous communication with the second apparatus, and a timing of synchronous communication with the fourth apparatus, such that a time point of end of synchronous communication with the first apparatus is substantially continuous to a time point of start of synchronous communication with the second apparatus, and a time point of end of synchronous communication with the second apparatus is substantially continuous to a time point of start of synchronous communication with the fourth apparatus;
   comparing a number of slots of synchronous communication of the second apparatus and a number of slots of synchronous communication of the fifth apparatus with each other; and
   adjusting timing of synchronous communication with the fifth apparatus based on a result of the comparison when the second apparatus quits communication such that (a) a time point of end of synchronous communication for the first apparatus is substantially continuous to a time point of start of synchronous communication for the fifth apparatus, provided that the number of slots of synchronous communication of the second apparatus is the same as or larger than the number of slots of synchronous communication of the fifth apparatus; and (b) a time point of end of synchronous communication for the fourth apparatus is substantially continuous to a time point of start of synchronous communication for the fifth apparatus, provided that the number of slots of synchronous communication of the second apparatus is smaller than the number of slots of synchronous communication of the fifth apparatus.

10. The method according to claim 9, wherein intervals of synchronous communication with the first apparatus, second apparatus, and fourth apparatus are substantially identical.

11. The method according to claim 9, further comprising setting reference timing serving as a reference of timing of synchronous communication with each of the first apparatus and the second apparatus.

12. The method according to claim 11, further comprising adjusting timing of any one or more of synchronous communication with the second apparatus and timing of synchronous communication with the fourth apparatus such that a time point of end of synchronous communication for the second apparatus is substantially continuous to a time point of start of synchronous communication for the fourth apparatus in accordance with the reference timing when synchronous communication with the fourth apparatus is established after synchronous communication with the first apparatus ended.

13. The method according to claim 11, further comprising adjusting timing of synchronous communication with each of the first apparatus, the second apparatus, and the fourth apparatus in accordance with the reference timing set in the reference timing setting processing.

14. The information processing apparatus according to claim 13, further comprising adjusting timing of any one or more of synchronous communication with the first apparatus, the second apparatus, and the fourth apparatus and timing of synchronous communication with the fifth apparatus in accordance with the reference timing such that the continuing synchronous communication is substantially continuous to synchronous communication with the fifth apparatus when synchronous communication with at least one of the first apparatus, the second apparatus, and the fourth apparatus ended.

15. A non-transitory storage medium encoded with a computer readable program, the program when executed causing a computer of an information processing apparatus that can communicate with a first apparatus, a second apparatus, a third apparatus, a fourth apparatus, and a fifth apparatus, to at least:
   establish synchronous communication with each of the first apparatus and the second apparatus in a Bluetooth sniff mode;
   establish synchronous communication with each of a fourth apparatus and a fifth apparatus in the Bluetooth sniff mode;
   communicate with the third apparatus under a wireless communication standard different from the Bluetooth standard;
   adjust, for providing a period of communication in the second communication processing, a timing of synchronous communication with the first apparatus, a timing of synchronous communication with the second apparatus, and a timing of synchronous communication with the fourth apparatus, such that a time point of end of synchronous communication with the first apparatus in the first communication processing is substantially continuous to a time point of start of synchronous communication with the second apparatus in the first communication processing, and a time point of end of synchronous communication with the second apparatus is substantially continuous to a time point of start of synchronous communication with the fourth apparatus;
   compare a number of slots of synchronous communication of the second apparatus and a number of slots of synchronous communication of the fifth apparatus with each other; and
   adjust timing of synchronous communication with the fifth apparatus based on a result of the comparison when the second apparatus quits communication such that (a) a time point of end of synchronous communication for the first apparatus is substantially continuous to a time point of start of synchronous communication for the fifth apparatus, provided that the number of slots of synchronous communication of the second apparatus is the same as or larger than the number of slots of synchronous communication of the fifth apparatus; and (b) a time point of end of synchronous communication for the fourth apparatus is substantially continuous to a time point of start of synchronous communication for the fifth apparatus, provided that the number of slots of synchronous communication of the second apparatus is smaller than the number of slots of synchronous communication of the fifth apparatus.

16. The non-transitory storage medium according to claim 15, wherein intervals of synchronous communication with the first apparatus, second apparatus, and fourth apparatus, are substantially identical.

17. The non-transitory storage medium according to claim 15, wherein the program when executed further causes the computer of the information processing apparatus to at least set reference timing serving as a reference of timing of synchronous communication with each of the first apparatus and the second apparatus by the first transceiver.

18. The non-transitory storage medium according to claim 17, wherein the program when executed further causes the computer of the information processing apparatus to at least adjust timing of any one or more of synchronous communication with the second apparatus and timing of synchronous communication with the fourth apparatus such that a time point of end of synchronous communication for the second apparatus is substantially continuous to a time point of start of synchronous communication for the fourth apparatus in accordance with the reference timing when synchronous communication with the fourth apparatus is established after synchronous communication with the first apparatus ended.

19. The non-transitory storage medium according to claim 17, wherein the program when executed further causes the computer of the information processing apparatus to at least adjust timing of synchronous communication with each of the first apparatus, the second apparatus, and the fourth apparatus in accordance with the reference timing set in the reference timing setting processing.

20. The non-transitory storage medium according to claim 19, wherein the program when executed further causes the computer of the information processing apparatus to at least adjust timing of any one or more of synchronous communication with the first apparatus, the second apparatus, and the fourth apparatus and timing of synchronous communication with the fifth apparatus in accordance with the reference timing such that the continuing synchronous communication is substantially continuous to synchronous communication with the fifth apparatus when synchronous communication with at least one of the first apparatus, the second apparatus, and the fourth apparatus ended.

21. An information processing system comprising:
an information processing apparatus; and
a first apparatus, a second apparatus, and a third apparatus, a fourth apparatus, and a fifth apparatus, each of which can communicate with the information processing apparatus, the information processing apparatus including:
a first transceiver configured to establish synchronous communication with each of the first apparatus and the second apparatus in a Bluetooth sniff mode, wherein the first transceiver is further configured to establish synchronous communication with each of a fourth apparatus and a fifth apparatus in the Bluetooth sniff mode,
a second transceiver configured to communicate with the third apparatus under a second wireless communication standard different from the Bluetooth standard, and
a control circuit configured to perform timing adjustment processing for adjusting, for providing a period of communication by the second transceiver, a timing of synchronous communication with the first apparatus, a timing of synchronous communication with the second apparatus, and a timing of synchronous communication with the fourth apparatus, such that a time point of end of synchronous communication with the first apparatus by the first transceiver is substantially continuous to a time point of start of synchronous communication with the second apparatus by the first transceiver, and a time point of end of synchronous communication with the second apparatus by the first transceiver is substantially continuous to a time point of start of synchronous communication with the fourth apparatus by the first transceiver,
wherein the control circuit is further configured to:
compare a number of slots of synchronous communication of the second apparatus and a number of slots of synchronous communication of the fifth apparatus with each other; and
adjust timing of synchronous communication with the fifth apparatus based on a result of the comparison when the second apparatus quits communication such that (a) a time point of end of synchronous communication for the first apparatus is substantially continuous to a time point of start of synchronous communication for the fifth apparatus, provided that the number of slots of synchronous communication of the second apparatus is the same as or larger than the number of slots of synchronous communication of the fifth apparatus; and (b) a time point of end of synchronous communication for the fourth apparatus is substantially continuous to a time point of start of synchronous communication for the fifth apparatus, provided that the number of slots of synchronous communication of the second apparatus is smaller than the number of slots of synchronous communication of the fifth apparatus.

22. The information processing system according to claim 21, wherein the control circuit is further configured to perform reference timing setting processing for setting reference timing serving as a reference of timing of synchronous communication with each of the first apparatus and the second apparatus by the first transceiver.

23. The information processing apparatus system to claim 22, wherein the control circuit is further configured to, as the timing adjustment processing, adjust timing of any one or more of synchronous communication with the second apparatus and timing of synchronous communication with the fourth apparatus such that a time point of end of synchronous communication for the second apparatus is substantially continuous to a time point of start of synchronous communication for the fourth apparatus in accordance with the reference timing when synchronous communication with the fourth apparatus is established after synchronous communication with the first apparatus ended.

24. The information processing system according to claim 22, wherein the control circuit is further configured to, as timing adjustment processing, adjust timing of synchronous communication with each of the first apparatus, the second apparatus, and the fourth apparatus by the first transceiver in accordance with the reference timing set in the reference timing setting processing.

* * * * *